(12) United States Patent
Kim et al.

(10) Patent No.: US 10,491,847 B2
(45) Date of Patent: Nov. 26, 2019

(54) SENSOR HAVING A MEMORY FOR CAPTURING IMAGE AND METHOD FOR CONTROLLING THE SAME

(71) Applicant: SAMSUNG ELECTRONICS CO., LTD., Suwon-si, Gyeonggi-do (KR)

(72) Inventors: Dong-Soo Kim, Suwon-si (KR); Hwa-Young Kang, Suwon-si (KR); Yeo-Tak Youn, Yongin-si (KR); Young-Kwon Yoon, Seoul (KR); Jong-Hun Won, Suwon-si (KR); Ki-Huk Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/852,667

(22) Filed: Dec. 22, 2017

(65) Prior Publication Data
US 2018/0184035 A1 Jun. 28, 2018

(30) Foreign Application Priority Data
Dec. 23, 2016 (KR) ........................ 10-2016-0178418

(51) Int. Cl.
*H04N 5/232* (2006.01)
*H04N 5/3745* (2011.01)
*H04N 5/378* (2011.01)

(52) U.S. Cl.
CPC ..... *H04N 5/37452* (2013.01); *H04N 5/23245* (2013.01); *H04N 5/378* (2013.01); *H04N 5/37455* (2013.01)

(58) Field of Classification Search
CPC .................................................. H04N 5/37452
See application file for complete search history.

(56) References Cited

U.S. PATENT DOCUMENTS

| | | | | |
|---|---|---|---|---|
| 7,556,442 | B2 * | 7/2009 | Frantz | G03B 7/26 257/428 |
| 8,946,610 | B2 * | 2/2015 | Iwabuchi | H01L 23/481 250/208.1 |
| 9,025,929 | B2 | 5/2015 | Kosakai et al. | |
| 9,654,699 | B2 * | 5/2017 | Shen | H04N 5/2353 |
| 2002/0118616 | A1 * | 8/2002 | Fujiwara | G11B 20/10527 369/47.29 |
| 2007/0285526 | A1 * | 12/2007 | Mann | H04N 5/23245 348/222.1 |
| 2009/0052238 | A1 * | 2/2009 | Shinagawa | G11C 16/06 365/185.01 |
| 2010/0276572 | A1 * | 11/2010 | Iwabuchi | H01L 23/481 250/208.1 |
| 2012/0307030 | A1 * | 12/2012 | Blanquart | H01L 27/14601 348/76 |
| 2013/0182804 | A1 * | 7/2013 | Yutaka | H04L 27/0002 375/347 |

(Continued)

*Primary Examiner* — Cynthia Segura
(74) *Attorney, Agent, or Firm* — Nixon & Vanderhye, P.C.

(57) ABSTRACT

An example sensor for image capturing may include a pixel array including a plurality of pixels; a read-out circuit configured to receive an analog electrical signal output from each of the plurality of pixels, convert the analog electrical signal into a digital electrical signal, and output the digital electrical signal; and a memory temporarily storing the digital electrical signal output from the read-out circuit and outputting at least part of the temporarily stored digital electrical signal to an external circuit.

15 Claims, 29 Drawing Sheets

(56) References Cited

U.S. PATENT DOCUMENTS

| | | | |
|---|---|---|---|
| 2014/0077063 A1* | 3/2014 | Cho | H01L 27/14618 250/208.1 |
| 2014/0160334 A1* | 6/2014 | Wakabayashi | H04N 5/343 348/308 |
| 2015/0163430 A1* | 6/2015 | Kanemitsu | H04N 5/378 348/308 |
| 2015/0189214 A1* | 7/2015 | Kurose | H01L 25/18 250/208.1 |
| 2015/0237247 A1* | 8/2015 | Hara | H04N 5/2353 348/362 |
| 2016/0043733 A1* | 2/2016 | Nezuka | H03M 3/464 341/143 |
| 2016/0204791 A1* | 7/2016 | Bagwe | H03M 1/20 341/156 |
| 2016/0205336 A1* | 7/2016 | Sato | H04N 19/122 348/322 |
| 2017/0006207 A1* | 1/2017 | Shen | H04N 5/2353 |
| 2017/0006238 A1* | 1/2017 | Kenzaburo | H04N 5/341 |
| 2017/0094113 A1* | 3/2017 | Togashi | H03M 1/1245 |
| 2017/0339327 A1* | 11/2017 | Koshkin | H04N 5/2355 |
| 2017/0344497 A1* | 11/2017 | Hoshikawa | G06F 13/36 |
| 2018/0077337 A1* | 3/2018 | Fujii | H04N 5/23212 |

\* cited by examiner

SENSOR HAVING A MEMORY FOR CAPTURING IMAGE AND METHOD FOR CONTROLLING THE SAME

CROSS-REFERENCE TO RELATED APPLICATION

This application is based on and claims the benefit under 35 U.S.C. § 119 of a Korean patent application filed in the Korean Intellectual Property Office on Dec. 23, 2016 and assigned Serial No. 10-2016-0178418, the entire contents of which are incorporated by reference herein in their entirety.

TECHNICAL FIELD

The present disclosure generally relates to sensors for capturing images and methods for controlling the same.

DISCUSSION OF RELATED ART

Recently, electronic devices are providing more diversified services and additional functions. Various applications executable on electronic devices are being developed to meet the demand of diverse users and to increase the utility of electronic devices.

These various applications include a camera application in which a user may take a selfie or background using the camera of her electronic device. The electronic device may include a camera module for capturing images. The camera module typically includes, for example and without limitation, a lens for collecting light, a photodiode for converting the collected light into an electrical signal, and an analog-to-digital converter (ADC) for converting the electrical signal, which is an analog signal, into a digital electrical signal. A process of a camera module that converts electrical signals from multiple photodiodes into digital electrical signals and outputs the digital electrical signals may be referred to as 'read-out.'

A long read-out time while taking a picture of a moving object may cause rolling artifacts. Thus, the read-out time needs to be set to be relatively short. However, interfaces for outputting read-out digital electrical signals often have their respective output speeds determined according to the standards. Consequently, generating an electrical signal at a relatively high speed by reading out in a relatively short time may not comply with the output speed defined for the interface. Although conventional electronic devices may enhance image quality by multi-sampling, doing so may lead to a relatively long read-out time, with the result of a failure to meet the output speed defined for the interface.

The background is presented only to assist with an understanding of the present disclosure. No determination has been made, and no assertion is made, as to whether any of the above might be applicable as prior art with regard to the present disclosure.

SUMMARY

Various example embodiments of the present disclosure provide an image capturing sensor with a memory. According to various embodiments of the present disclosure, a sensor capable of outputting data to comply with the output speed defined for an interface may be provided even when high-speed read-out or multi-sampling is performed. A corresponding method for controlling the same is also provided.

According to an example embodiment of the present disclosure, a sensor may comprise a pixel array including a plurality of pixels, a read-out circuit configured to receive an analog electrical signal output from each of the plurality of pixels, convert the analog electrical signal into a digital electrical signal, and output the digital electrical signal, and a memory configured to temporarily store the digital electrical signal output from the read-out circuit and output at least part of the temporarily stored digital electrical signal to an external device.

According to an example embodiment of the present disclosure, a method for controlling a sensor including a plurality of pixels and a memory may comprise converting an analog electrical signal output from each of the plurality of pixels into a digital electrical signal, temporarily storing the digital electrical signal in the memory, and outputting at least part of the temporarily stored digital electrical signal to an external circuit.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and/or other aspects, features, and attendant advantage of the present disclosure will be more apparent and readily understood from the following detailed description of certain example embodiments of the present disclosure, taken in conjunction with the accompanying drawings, in which like reference numerals refer to like elements and wherein.

Throughout the drawings, like reference numerals will be understood to refer to like parts, components, and structures.

DETAILED DESCRIPTION

Figure 1:
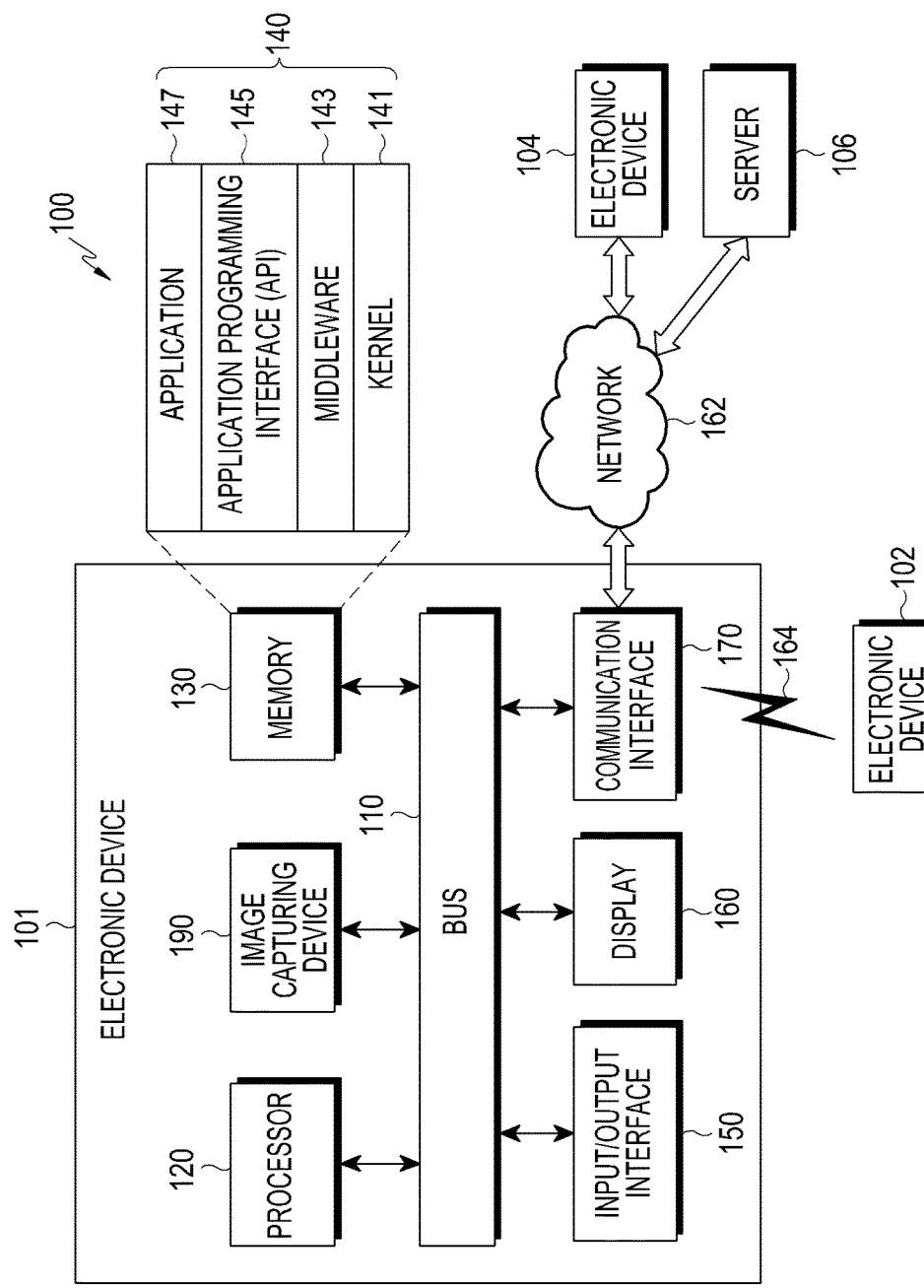
FIG. 1 is a block diagram illustrating an electronic device and a network according to an example embodiment of the present disclosure.

Hereinafter, example embodiments of the present disclosure are described with reference to the accompanying drawings. However, it should be appreciated that the present disclosure is not limited to the example embodiments and that the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish one component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. The term "configured to" may describe that a device can perform an operation together with another device or parts. For example, the term "processor configured (or set) to perform A, B, and C" may refer to a general-purpose processor (e.g., a CPU or application processor) that may perform the operations by executing one or more software programs stored in a memory device and/or a dedicated processor (e.g., an embedded processor) for performing the operations.

The electronic device according to example embodiments of the present disclosure may include without limitation at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include without limitation at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include without limitation at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an example embodiment of the present disclosure, the electronic device may include without limitation at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may include without limitation at least one of part of a piece of furniture, building/structure or vehicle, an electronic board, an electronic signature receiving device, a projector, or various measurement devices (e.g., devices for measuring water, electricity, gas, or electromagnetic waves). According to example embodiments of the present disclosure, the electronic device may be flexible or may be a combination of the above-enumerated electronic devices. According to an example embodiment of the present disclosure, the electronic device is not limited to the above-listed devices and may include other device(s). As used herein, the term "user" may denote a human or another device (e.g., an artificial intelligent electronic device) using the electronic device.

Referring to FIG. 1, according to an example embodiment of the present disclosure, an electronic device 101 is included in a network environment 100. The electronic device 101 may include a bus 110, a processor 120, a memory 130, an input/output interface 150, a display 160, a communication interface 170, and an image capturing device 190, e.g., an image sensor or camera. In some example embodiments, the electronic device 101 may exclude at least one of these components and/or may include some other different component. The bus 110 may include a circuit for connecting the components 120, 130, 150, 160, 170, and 190 with one another and transferring communications (e.g., control messages or data) between the components. The processor 120 may include one or more of a central processing unit (CPU), an application processor (AP), a communication processor (CP), and/or other processing circuitry. The processor 120 may perform control for at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an example embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 145 may include at least one interface or function (e.g., a command) for file control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, for example and without limitation, a liquid crystal display (LCD), a light emitting diode (LED) display, an organic light emitting diode (OLED) display, a microelectromechanical systems (MEMS) display, and/or an electronic paper display. The display 160 may display, e.g., various content (e.g., text, images, videos, icons, and/or symbols) to the user. The display 160 may include a touchscreen and may receive, e.g., a touch, gesture, proximity or hovering input using an electronic pen or a body portion of the user. The communication interface (e.g., including communication interface circuitry) 170 may set up communication between the electronic device 101 and an external electronic device (e.g., a first electronic device 102, a second electronic device 104, and/or a server 106). For example, the communication interface 170 may be connected with the network 162 through wireless or wired communication to communicate with the external electronic device (e.g., the second external electronic device 104 or server 106). The communication interface 170 may also communicate with the first electronic device 102 over a direct communication link 164 (e.g., near field communication).

The wireless communication may include without limitation cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), and/or global system for mobile communication (GSM). According to an example embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, and/or body area network (BAN). According to an example embodiment of the present disclosure, the wireless communication may include without limitation global navigation satellite system (GNSS). GNSS may be, e.g., global positioning system (GPS), global navigation satellite system (Glonass), Beidou navigation satellite system (hereinafter, "Beidou") or Galileo, and/or the European global satellite-based navigation system. Hereinafter, the terms "GPS" and "GNSS" may be interchangeably used herein. The wired connection may include without limitation at least one of, e.g., universal serial bus (USB), high definition multimedia interface (HDMI), recommended standard (RS)-232, power line communication (PLC), and/or plain old telephone service (POTS). The network 162 may include without limitation at least one of telecommunication networks, e.g., a computer network (e.g., local area network (LAN) or wide area network (WAN)), Internet, and/or a telephone network.

The image capturing device 190, i.e., an image sensor or a camera, may capture an image of an external front and/or rear views of the electronic device and output a result of the image capturing. For example, the image capturing device 190 may convert light received from the outside (e.g., external light) into an electrical signal and output the electrical signal. The electrical signal may be output through the bus 110 to the processor 120 and processed by the processor 120 or stored in the memory 130. The image capturing device 190 may include a pixel including, e.g., a photodiode that converts received light into an electrical signal. The image capturing device 190 may also include an analog-todigital converter (ADC) that converts an analog electrical signal into a digital electrical signal and outputs the digital electrical signal. The image capturing device 190 may include a decoder (e.g., decoding circuit) for scanning a plurality of pixels. The image capturing device 190 may include an internal memory. The image capturing device 190 may temporarily store a digital electrical signal, e.g., data output from a pixel, in the internal memory and output the digital electrical signal to an external circuit (e.g., the bus 110, the processor 120, or the memory 130). The data may be output from the memory in the image capturing device 190 at a speed set in accordance with an interface for data input/output which is described below in greater detail.

The first and second external electronic devices 102 and 104 each may be a device of the same or a different type from the electronic device 101. According to an example embodiment of the present disclosure, all or some of the operations executed on the electronic device 101 may be executed on another or multiple other electronic devices (e.g., the electronic devices 102 and 104 or server 106). According to an example embodiment of the present disclosure, when the electronic device 101 performs some function or service automatically or based on a request, the electronic device 101, instead of executing the function or service on its own, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or apply further processing. To that end, a cloud computing, distributed computing, or client-server computing technique may be used, for example.

Figure 2:
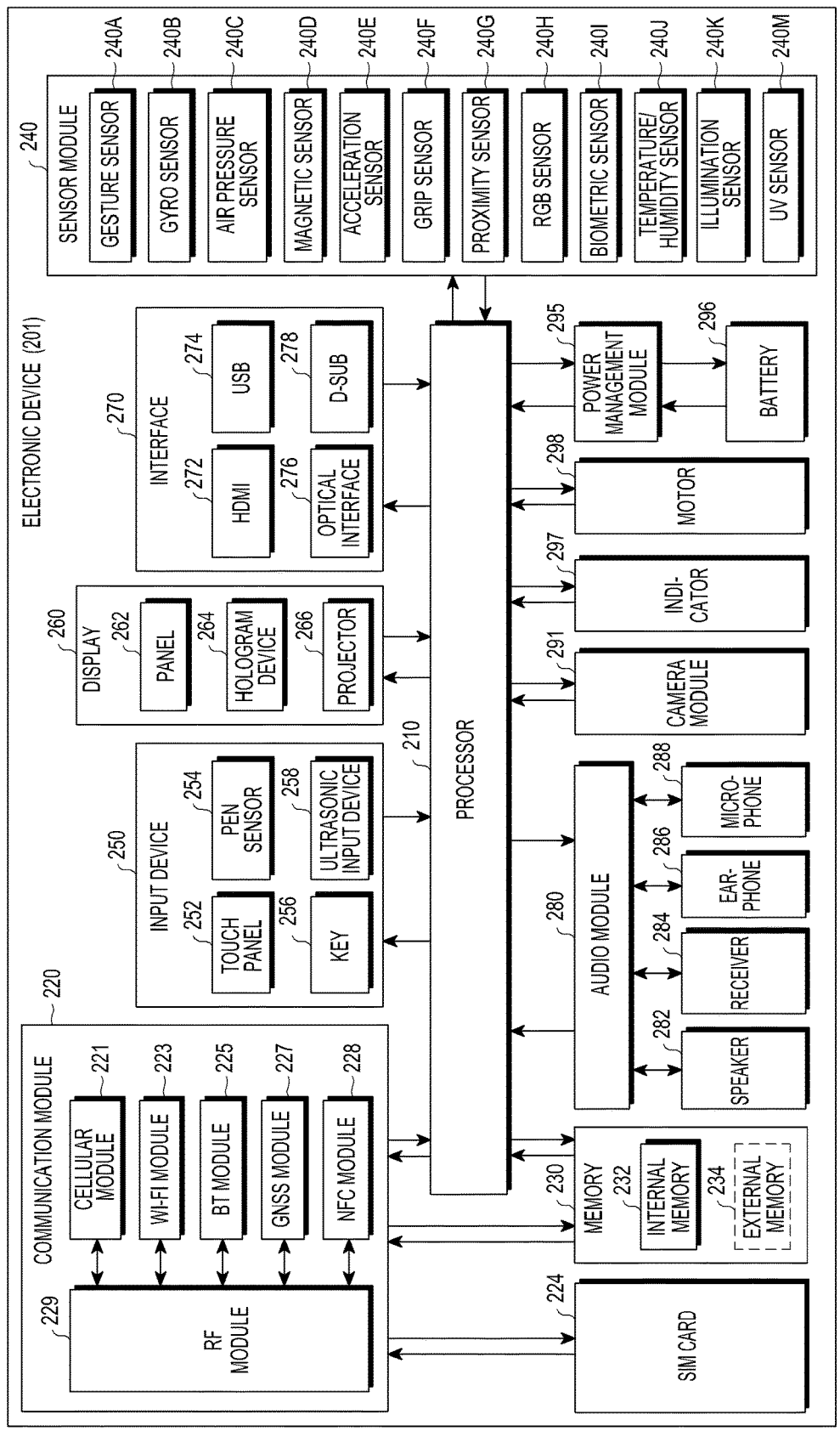
FIG. 2 is a block diagram illustrating an electronic device according to an example embodiment of the present disclosure.

FIG. 2 is a block diagram illustrating an electronic device 201 according to an example embodiment of the present disclosure. An electronic device 201 may include all or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an example embodiment of the present disclosure, the processor 210 may further include a graphic processing unit (GPU) and/or an image signal processor. The processor 210 may include at least some of the components (e.g., the cellular module 221) shown in FIG. 2. The processor 210 may load a command or data received from at least one of other components (e.g., a non-volatile memory) to a volatile memory, process the command or data, and store resultant data in the non-volatile memory.

The communication module 220 may have the same or similar configuration to the communication interface 170. The communication module 220 may include, for example and without limitation, a cellular module 221, a wireless fidelity (Wi-Fi) module 223, a bluetooth (BT) module 225, a GNSS module 227, a NFC module 228, and a RF module 229. The cellular module 221 may provide voice call, video call, text, and/or Internet services through, e.g., a communication network. According to an example embodiment of the present disclosure, the cellular module 221 may perform identification or authentication on the electronic device 201 in the communication network using a subscriber identification module 224 (e.g., the SIM card). According to an example embodiment of the present disclosure, the cellular module 221 may perform at least some of the functions providable by the processor 210. According to an example embodiment of the present disclosure, the cellular module 221 may include a communication processor (CP). According to an example embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), an antenna, and/or other circuitry. According to an example embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 234 may include without limitation a flash drive, e.g., a compact flash (CF) memory, a secure digital (SD) memory, a micro-SD memory, a min-SD memory, an extreme digital (xD) memory, a multi-media card (MMC), and/or a Memory Stick™. The external memory 234 may be functionally or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric (air) pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, and/or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit and other circuitry for controlling at least one or more of the sensors included in the sensing module. According to an example embodiment of the present disclosure, the electronic device 201 may further include a processor configured to control the sensor module 240 as part of the processor 210 or separate from the processor 210, and the electronic device 201 may control the sensor module 240 while the processor 210 is in a sleep mode.

The input unit (e.g., including input circuitry) 250 may include, for example and without limitation, a touch panel 252, a (digital) pen sensor 254, a key 256, and/or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or control circuitry for controlling the same. The panel 262 may be implemented to be flexible, transparent, or wearable. The panel 262, together with the touch panel 252, may be configured in one or more modules. According to an example embodiment of the present disclosure, the panel 262 may include a pressure sensor (or force sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface (e.g., interface circuitry) 270 may include, for example and without limitation, a high definition multimedia interface (HDMI) 272, a USB 274, an optical interface 276, and/or a D-subminiature (D-sub) 278. The interface 270 may be included in e.g., the communication interface 170 shown in FIG. 1. Additionally or alternatively, the interface 270 may include without limitation a mobile high-definition link (MHL) interface, a secure digital (SD) card/multimedia card (MMC) interface, and/or infrared data association (IrDA) standard interface.

The audio module (e.g., including audio circuitry) 280 may convert, e.g., a sound signal into an electrical signal and vice versa. At least a part of the audio module 280 may be included in e.g., the input/output interface 145 shown in FIG. 1. The audio module 280 may process sound information input or output through e.g., a speaker 282, a receiver 284, an earphone 286, and/or a microphone 288. The camera module 291 may be a device for capturing still images and videos, and may include, according to an example embodiment of the present disclosure, one or more image sensors (e.g., front and back cameras), a lens, an image signal processor (ISP), and/or a flash such as an LED or xenon lamp. The power manager module 295 may manage power of the electronic device 201, for example. According to an example embodiment of the present disclosure, the power manager module 295 may include without limitation a power management Integrated circuit (PMIC), a charger IC, and/or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery. The camera module 291 may be the same as, e.g., the image capturing device 190 of FIG. 1, and the camera module 291 may be denoted a sensor or image sensor throughout the specification.

The indicator (e.g., including an LED and other indicator circuitry) 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various example embodiments, the electronic device (e.g., the electronic device 201) may exclude some elements or include other elements, and/or some of the elements may be combined into a single entity that may perform the same function as by the elements before combined.

Figure 3:
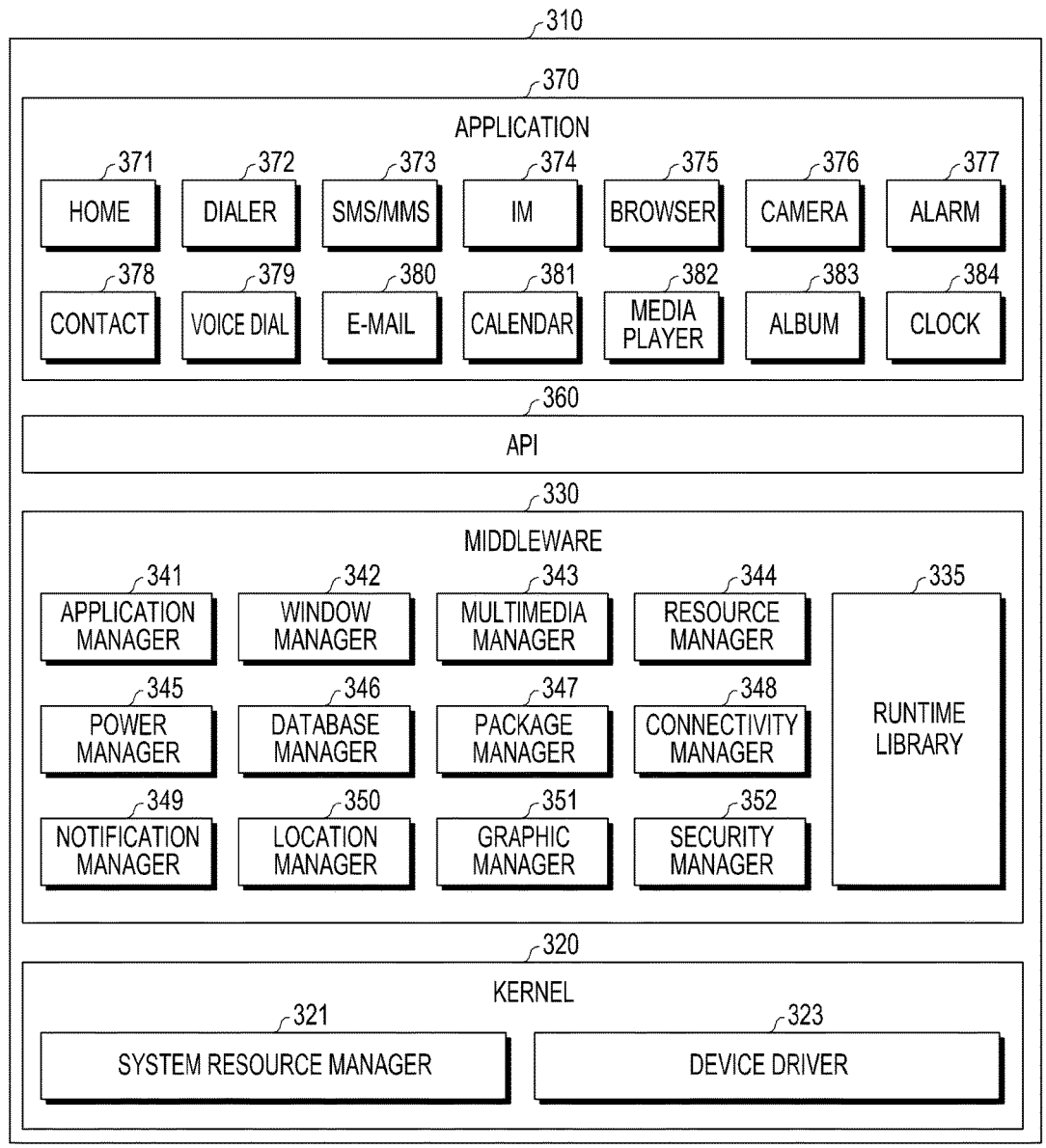
FIG. 3 is a block diagram illustrating a program module according to an example embodiment of the present disclosure.

FIG. 3 is a block diagram illustrating a program module according to an example embodiment of the present disclosure. According to an example embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an example embodiment of the present disclosure, the system resource manager 321 may include without limitation a process managing unit, a memory managing unit, and/or a file system managing unit. The device driver 323 may include, for example and without limitation, a display driver, a camera driver, a bluetooth driver, a shared memory driver, a USB driver, a keypad driver, a Wi-Fi driver, an audio driver, and/or an interprocess communication (IPC) driver. The middleware 330 may provide various functions to the application 370 through the API 360 so that the application 370 may use limited system resources in the electronic device or provide functions jointly required by applications 370. According to an example embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler in order to add a new function through a programming language while, e.g., the application 370 is being executed. The runtime library 335 may perform input/output management, memory management, and/or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an example embodiment of the present disclosure, the power manager 345 may interwork with a basic input/output system (BIOS). The database manager 346 may generate, search, or vary a database to be used in the applications 370. The package manager 347 may manage installation and/or update of an application that is distributed in the form of a package file.

The connectivity manager 348 may manage, e.g., wireless connectivity. The notification manager 349 may provide an event, e.g., arrival message, appointment, and/or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an example embodiment of the present disclosure, the middleware 330 may include a telephony manager for managing the voice or video call function of the electronic device or a middleware module able to form a combination of the functions of the above-described elements. According to an example embodiment of the present disclosure, the middleware 330 may provide a module specified according to the type of the operating system. The middleware 330 may dynamically omit some existing components or include other components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an applications such as, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, and/or a clock 384, a heath-care (e.g., measuring the degree of workout or blood sugar), or for providing environmental information (e.g., provision of air pressure, moisture, or temperature information). According to an example embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by another application of the electronic device to the external electronic device or receive notification information from the external electronic device and provide the received notification information to the user. For example, the device management application may install, delete, and/or update a function (e.g., turn-on/turn-off the external electronic device (or some elements) or adjust the brightness (or resolution) of the display) of the external electronic device communicating with the electronic device or an application operating on the external electronic device. According to an example embodiment of the present disclosure, the application 370 may include an application (e.g., a health-care application of a mobile medical device) designated according to an attribute of the external electronic device. According to an example embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" may refer to a unit configured in hardware, software, or firmware and may interchangeably be used with other terms, e.g., "logic," "logic block," "part," or "circuit." The module may be a single integral part or a minimum unit or part for performing one or more functions. The module may be implemented mechanically and/or electronically and may include, for example and without limitation, an application-specific integrated circuit (ASIC) chip, field-programmable gate arrays (FPGAs), and/or programmable logic device, that has been known or to be developed in the future as performing some operations. According to an example embodiment of the present disclosure, at least a part of the device (e.g., modules or their functions) or method (e.g., operations) may be implemented as instructions stored in a non-transitory computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instruction may include a code created by a compiler or a code executable by an interpreter. Modules or programming modules in accordance with various example embodiments of the present disclosure may include at least one or more of the aforementioned components, omit some of them, or further include other additional components. Operations performed by modules, programming modules or other components in accordance with various example embodiments of the present disclosure may be carried out sequentially, in parallel, repeatedly or heuristically, or at least some operations may be executed in a different order or omitted, or other operations may be added.

Figure 4A:
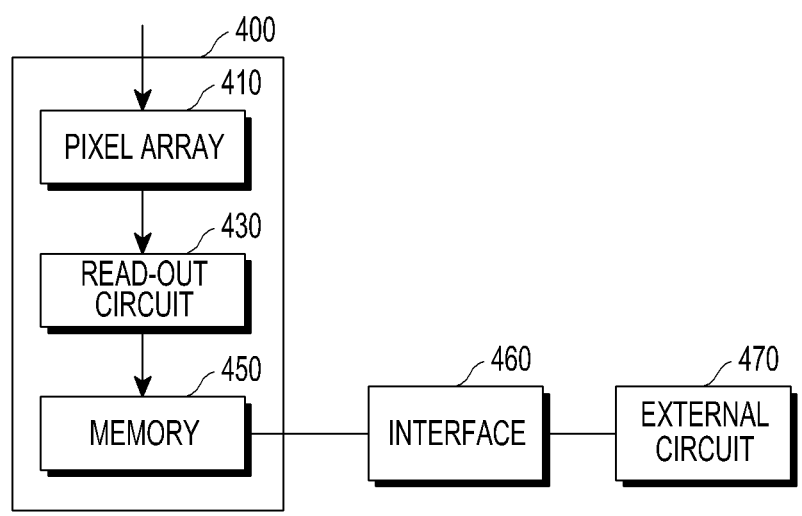
FIG. 4A is a block diagram illustrating an electronic device for capturing an image according to an example embodiment of the present disclosure.

FIG. 4A is a block diagram illustrating a sensor for capturing an image according to an example embodiment of the present disclosure. A sensor 400 may be, e.g., the image capturing device 190 of FIG. 1 or the camera module 291 of FIG. 2. The sensor 400 may include a pixel array 410, a read-out circuit 430, and a memory 450. The pixel array 410 may include a plurality of pixels, e.g., multiple pixels arrayed in a two-dimensional (2D) array.

The read-out circuit 430 may receive an analog electrical signal from the pixel array. The read-out circuit 430 may receive an analog electrical signal per line sequentially from each of the plurality of pixels in the pixel array or receive analog electrical signals substantially simultaneously from the plurality of pixels. For example, the read-out circuit 430 may receive an analog electrical signal from a first pixel, an analog electrical signal from a second pixel, and then an analog electrical signal from a third pixel. The read-out circuit 430 may substantially simultaneously receive analog electrical signals from the first pixel and the second pixel, and then, the read-out circuit 430 may substantially simultaneously receive analog electrical signals from the third pixel and a fourth pixel. The read-out circuit 430 may include a circuit, e.g., a switching device, which is capable of receiving an analog electrical signal from each of the plurality of pixels. The read-out circuit 430 may also include an analog-to-digital converter (ADC) that converts an analog electrical signal into a digital electrical signal and outputs the digital electrical signal. According to an example embodiment of the present disclosure, the read-out circuit 430 may include a plurality of ADCs. Each of the plurality of ADCs may be connected to the photodiode (or photodiode line) of one pixel according to an image capturing mode. Alternatively, the plurality of ADCs may process in parallel analog signals output from the photodiodes. For example, in a low-illuminance image capturing mode, at least two or more of the plurality of ADCs may be connected to photodiodes (or photodiode lines) to convert analog electrical signals from the photodiodes into digital electrical signals. As each of the plurality of ADCs converts an analog electrical signal output from a photodiode into a digital electrical signal, an error due to sampling may be suppressed. For example, each ADC may perform sampling on one analog electrical signal at a different position, thereby suppressing a sampling error that may arise in the low-illuminance environment. This is described below in greater detail with reference to FIG. 10B. Meanwhile, in a high-illuminance image capturing mode, each of the plurality of ADCs may be connected to a respective one of the photodiodes. For example, one ADC may be connected to a photodiode. For example, a first ADC may be connected to a first photodiode, and a second ADC may be connected to a second photodiode. In this case, the first ADC may convert an analog electrical signal from the first photodiode into a digital electrical signal, and the second ADC may convert an analog electrical signal from the second photodiode into a digital electrical signal. The first ADC and the second ADC may substantially simultaneously perform conversion, thus enabling parallel conversion. Accordingly, conversion of analog signals from the plurality of photodiodes may be done at a relatively high speed. The details of the per-image capturing mode operations are described below in more detail.

The memory 450 may temporarily store digital electrical signals. The memory 450 may output an electrical signal stored therein at an output speed defined for an interface. For example, where the interface 460 is one defined by the mobile industry processor interface (MIPI) alliance, the output cycle may be set as, e.g., $\frac{1}{30}$ sec. In other words, the interface 460 may be configured to deliver a digital electrical signal corresponding to one frame read out from the pixel array to an external circuit 470 at a cycle of $\frac{1}{30}$ sec. That is, the interface 460 may be set to output at a speed of, e.g., 30 frames per second (fps). The external circuit 470 may be a circuit for processing digital electrical signals or delivering digital electrical signals to another circuit, such as a bus, memory, or processor.

The read-out circuit 430 may perform a read-out that receives the electrical signal from the pixel array 410 for, e.g., $\frac{1}{120}$ sec and outputs to the ADC. In other words, the read-out circuit 430 may perform a read-out at, e.g., 120 fps. According to an example embodiment of the present disclosure, the read-out circuit 430 may include a plurality of ADCs. The read-out circuit 430 may perform a read-out at a relatively high read-out speed by processing in parallel a plurality of analog electrical signals output from the pixel array 410. According to an example embodiment of the present disclosure, the read-out circuit 430 may include an ADC that has a relatively high converting speed or a row decoder and column decoder that have a relatively high decoding speed. Thus, the read-out speed may be relatively high.

The memory 450 may receive and store electrical signals read out for $\frac{1}{120}$ seconds and output the electrical signals to the external circuit 470 through the interface 460 at a cycle of $\frac{1}{30}$ sec. In other words, the memory 450 may output electrical signals read out at an output speed of 30 fps. Thus, the electrical signal read out at a read-out speed of 120 fps may be output at an output speed of 30 fps which is defined for the interface 460, thereby meeting the preset interface output speed. In particular, a read-out is performed at a relatively high speed, i.e., 120 fps, and thus, rolling artifacts which occur upon capturing a moving object may be prevented. Further, even where the output speed defined for the interface 460 is varied, the output speed alone of the memory 450 may be adjusted program-wise, thus leading to enhanced interface compatibility.

Meanwhile, the read-out circuit 430 may perform a read-out for $\frac{1}{120}$ sec and abstain from performing a particular operation for $\frac{3}{120}$ sec. In this case, the memory 450 may store digital electrical signals received for $\frac{1}{120}$ sec and then output digital electrical signals stored for $\frac{1}{30}$. Alternatively, the read-out circuit 430 may perform four read-outs for $\frac{1}{120}$ sec in such a way that it repeats a read-out after performing a read-out for $\frac{1}{120}$ sec. In this case, the memory 450 may store four digital electrical signals. The memory 450 may output an electrical signal corresponding to one frame among the four digital electrical signals for $\frac{1}{30}$ sec and delete the other digital electrical signals. According to an example embodiment of the present disclosure, one frame may be generated using four digital electrical signals, and the generated frame may be output for $\frac{1}{30}$ sec. In this case, the sensor 400 may further include an additional computation circuit which is described below in greater detail. Where the computation circuit is added, multi-sampling may be performed which is also described below in greater detail.

As set forth above, as the memory 450 is included in the sensor 400, the read-out speed may be set to be different from the speed of output to the outside of the sensor 400. Accordingly, although a read-out is performed at a relatively high speed, the output speeds required for existing or other various types of interfaces may be met.

Figure 4B:
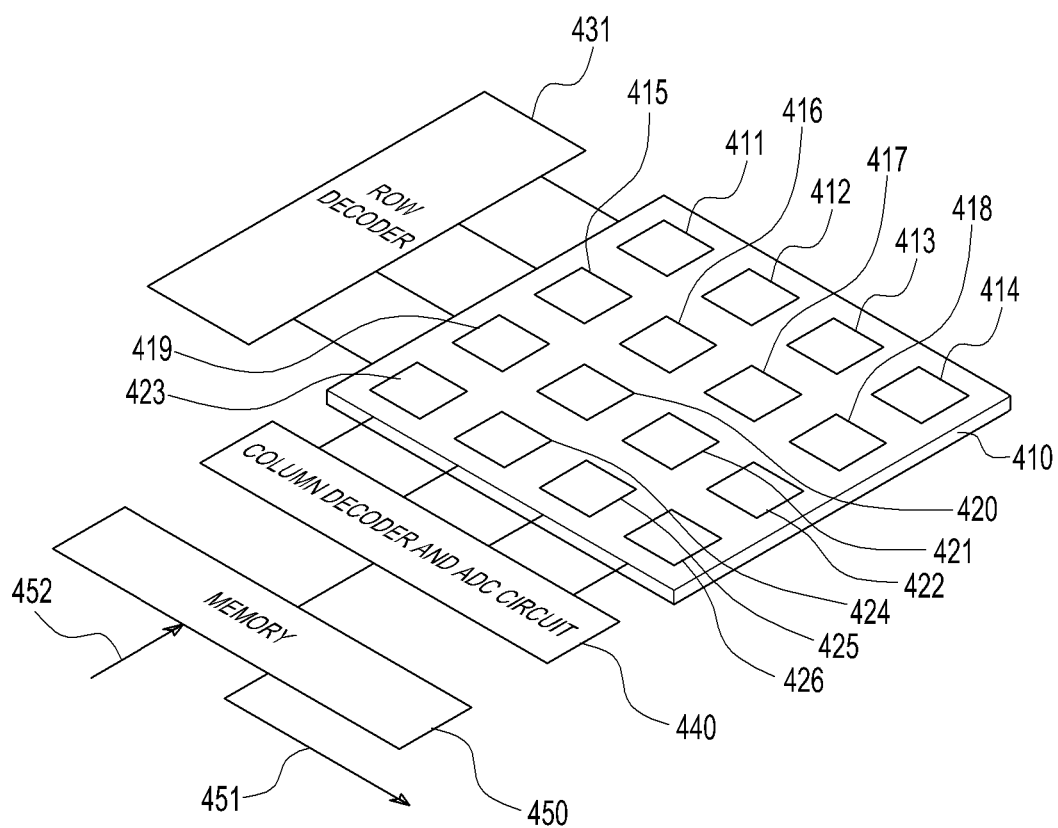
FIG. 4B is a conceptualized view illustrating an electronic device according to an example embodiment of the present disclosure.

FIG. 4B is a conceptualized view illustrating a sensor according to an example embodiment of the present disclosure.

Referring to FIG. 4B, the pixel array 410 may include a plurality of pixels 411 to 426. Each of the plurality of pixels 411 to 426 may include a photodiode and a lens system for collecting light beams. A row decoder 431 may determine a row that is subject to a read-out. A column decoder and ADC circuit 440 may determine a column that is subject to a read-out. A row and column to be read out may be determined by the row decoder 431 and the column decoder and ADC circuit 440, and thus, a pixel to be read out may be determined. Although not shown, a plurality of switches may be disposed between the row decoder 431 and the pixel array 410, and a switch corresponding to a row determined to be read out may be controlled in an on state. A plurality of switches may be disposed between the column decoder and ADC circuit 440 and the pixel array 410, and a switch corresponding to a column determined to be read out may be controlled in an on state. Meanwhile, the column decoder and ADC circuit 440 may include a plurality of ADCs in which case the column decoder and ADC circuit 440 may parallel-convert analog electrical signals from a plurality of pixels into digital electrical signals for substantially the same period of time. Thus, a read-out may be performed at a relatively high speed as compared with when one ADC is included.

Meanwhile, as set forth above, the memory 450 may temporarily store electrical signals read out from the column decoder and ADC circuit 440. A read-out electrical signal temporarily stored in the memory 450 may be output 451 to the outside. The speed at which the electrical signal is output may be controlled by a memory control signal 452 from the outside. For example, the processor 120 connected with the sensor 400 may set the output speed of the memory 450 corresponding to an output speed set for an interface corresponding to the sensor 400. Accordingly, the read-out speed may differ from the output speed. Even where data is read out at a relatively high speed, the output speed set for the interface may be met. In particular, even when the set speed is varied in accordance with interfaces, the output speed required for the interfaces may be met by simply changing the output speed of the memory 450.

Figure 4C:
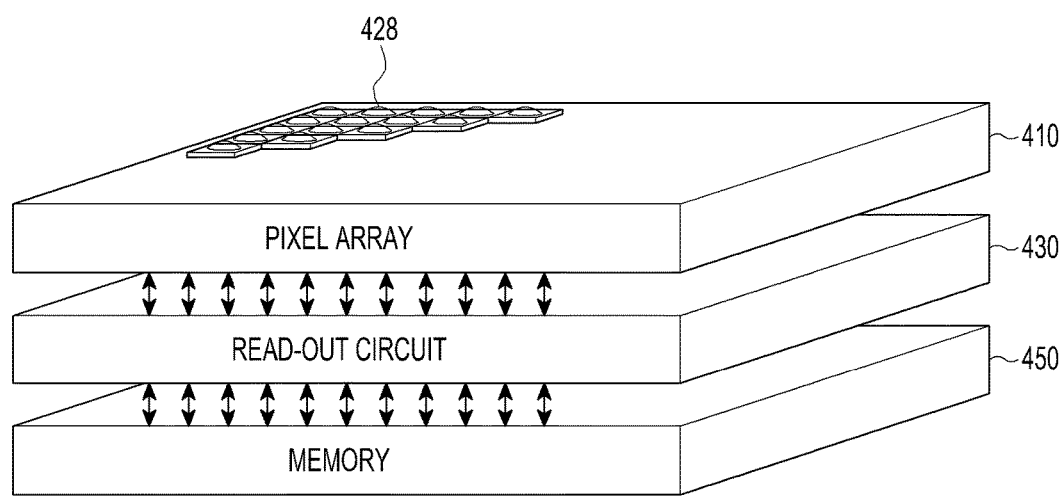
FIG. 4C is a conceptualized view illustrating an electronic device with a stack structure according to an example embodiment of the present disclosure.

FIG. 4C is a conceptualized view illustrating a sensor with a stack structure according to an example embodiment of the present disclosure.

Referring to FIG. 4C, a read-out circuit 430 may be disposed under a pixel array 410. A memory 450 may be disposed under the read-out circuit 430. In other words, a sensor 400 according to an example embodiment of the present disclosure may be implemented in a stack structure. As set forth above, the pixel array 410, the read-out circuit 430, and the memory 450 may be stacked one over another, and the sensor 400 may thus be produced in a relatively small mounting area. Meanwhile, a plurality of lenses 428 may be arranged for light collection in the pixel array 410 as described above.

Figure 5:
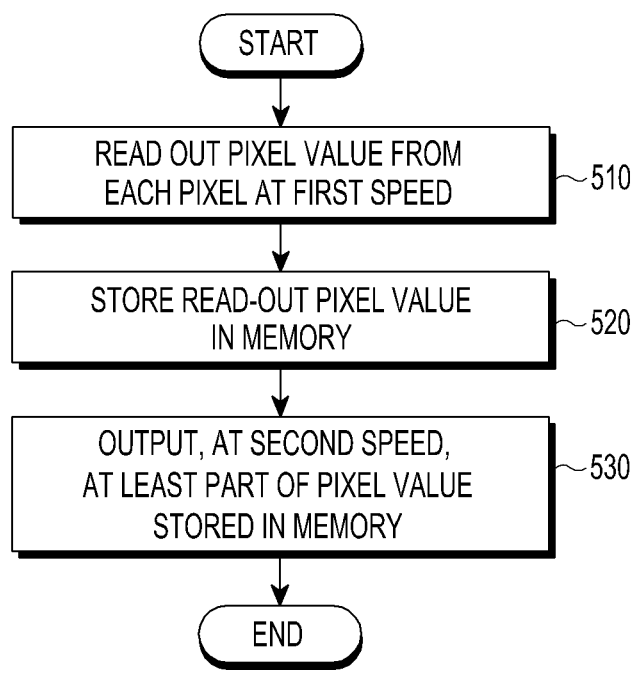
FIG. 5 is a flowchart illustrating a method for controlling an electronic device according to an example embodiment of the present disclosure.

FIG. 5 is a flowchart illustrating a method for controlling a sensor according to an example embodiment of the present disclosure.

In operation 510, a sensor 400 may read out a pixel value from each pixel at a first speed. The unit of the first speed may be, e.g., fps, and may be the reciprocal of the time during which the read-out circuit receives an analog electrical signal corresponding to one frame from all the pixels in the pixel array and converts the received analog electrical signal into a digital electrical signal. For example, where it takes 1/120 sec for the read-out circuit to receive an analog electrical signal and convert the analog electrical signal into a digital electrical signal, the first speed of the read-out may be 120 fps. Meanwhile, according to an example embodiment of the present disclosure, an additional operation(s) may also be performed. The reciprocal of the cycle at which the read-out circuit outputs a digital signal corresponding to one frame may be denoted the first speed. As set forth above, the read-out circuit of the sensor 400 may include an ADC that performs conversion at a relatively high speed or a decoding circuit that receives an electrical signal from a pixel at a relatively high speed. Thus, the first speed may be a relatively high speed.

In operation 520, the sensor 400 may store read-out data in the memory. In operation 530, the sensor 400 may output at least part of the data stored in the memory at a second speed. According to an example embodiment of the present disclosure, the sensor 400 may communicate data with an external circuit based on an interface that complies with a wired or wireless communication standard. The sensor 400 may output at least part of the data stored in the memory to the external circuit at the second speed that has been set in accordance with the interface. For example, where the speed set in accordance with the interface is 30 fps, the sensor 400 may output the data stored in the memory, i.e., the digital electrical signal, at an output speed of 30 fps. For example, the sensor 400 may also output the whole data stored in the memory at the second speed, or the sensor 400 may compute the data stored in the memory and output the data at the second speed. Alternatively, the sensor 400 may output part of the data stored in the memory at the second speed. Where the sensor 400 wirelessly transmits data, the sensor 400 may deliver the data stored in the memory to a wireless channel circuit. In this case, the speed of output from the memory may be set to be the output speed required for the wireless channel circuit. Meanwhile, the second speed may be the same as the first speed. For example, the sensor 400 may perform a read-out at a speed set for the interface as per the image capturing mode in which case the first speed may be identical to the second speed.

Figure 6A:
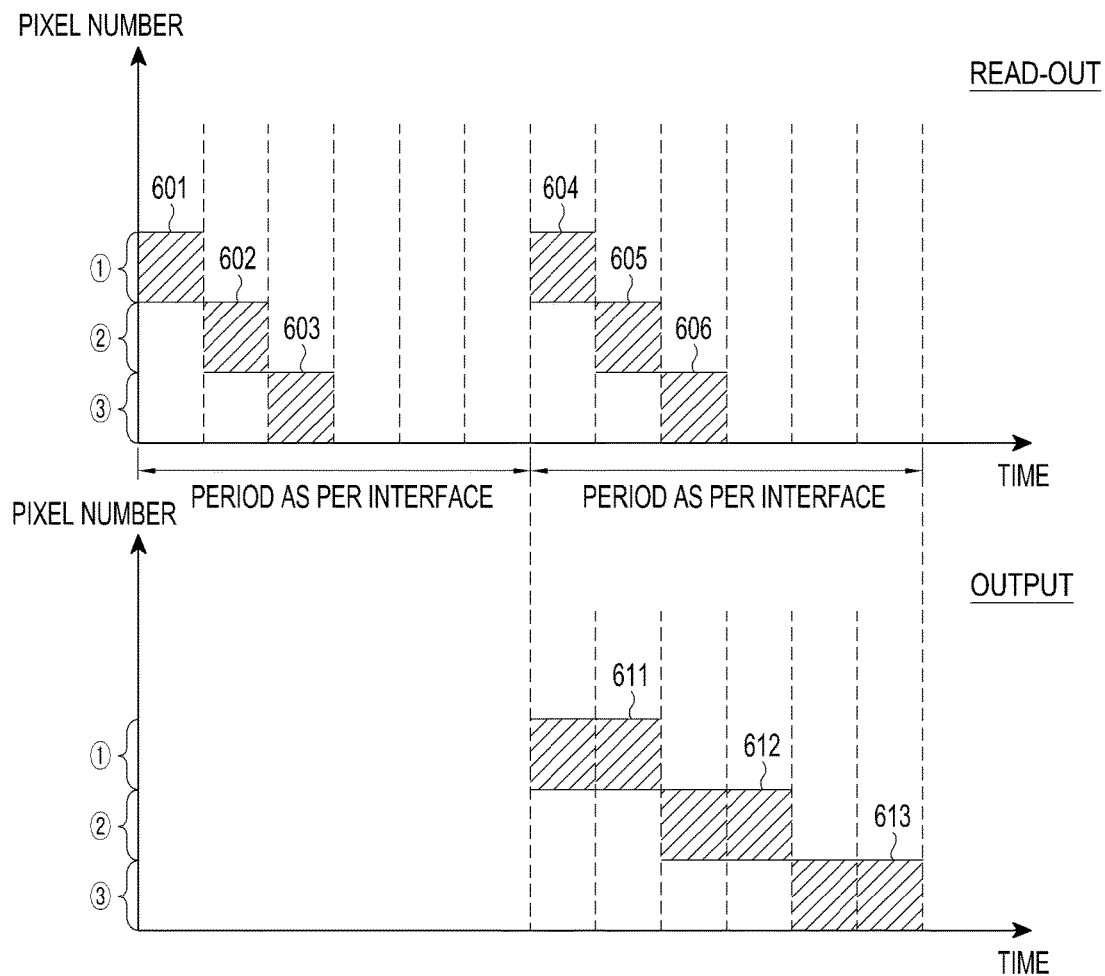
FIG. 6A is a conceptualized view illustrating a read-out speed and an output speed according to an example embodiment of the present disclosure.

FIG. 6A is a conceptualized view illustrating a read-out speed and an output speed according to an example embodiment of the present disclosure.

The top graph of FIG. 6A represents the read-out of the pixel. In the graph, the x axis corresponds to time, and the y axis corresponds to the pixel number. For example, ①, ②, and ③ may refer to a first pixel, a second pixel, and a third pixel, respectively. For ease of description, an example is described in which the pixel array includes the first to third pixels. However, it will be readily appreciated by one of ordinary skill in the art that the number of pixels is not limited thereto. The y axis may also be the line number. For example, ①, ②, and ③ may refer to a first line, a second line, and a third line, respectively. According to an example embodiment of the present disclosure, the sensor 400 may perform a read-out at a first speed. For example, the sensor 400 may set the read-out time 601 of the first data as one unit time. The sensor 400 may set the read-out time 602 of the second data as one unit time. Further, the sensor 400 may set the read-out time 603 of the third data as one unit time. Accordingly, the sensor 400 may perform read-outs on the three data items for the three unit times, and the first speed may be ⅓ (frame/unit time). The sensor 400 may include an ADC that has a relatively high converting speed or a device that has a relatively high decoding speed, and thus, the first speed may be a relatively high speed. The read-out data may temporarily be stored in the memory. According to an example embodiment of the present disclosure, the read-out circuit may read out data from the pixel array for the three unit times and abstain from performing an operation for the other (next) three unit times.

Meanwhile, the data communication interface of the sensor 400 may be set to have an output speed that is a second speed. For example, the second speed may be ⅙ (frame/unit time), and may be lower than the read-out speed, i.e., the first speed. The sensor 400 may set the output time 611 of the first data stored in the memory as two unit times, the output time 612 of the second data as two unit times, and the output time 613 of the third data as two unit times. Thus, the sensor 400 may output the stored data at a cycle of six unit times and may output data at an output speed of ⅙ (frame/unit time) set in accordance with the interface. Meanwhile, while data is output from the memory, the read-out circuit may read out data for a second frame. Each read-out time 604, 605, and 606 of the second frame may also be set as one unit time. The corresponding data may temporarily be stored in the memory and may then be output through the interface at the second speed. Meanwhile, although in the embodiment of FIG. 6A the sensor 400 outputs data a predetermined time after the read-out times 601, 602, and 603 of data elapse, this is merely an example. According to an example embodiment of the present disclosure, the sensor 400 may output data at the second speed immediately after the data read-out times 601, 602, and 603 elapse.

Figure 6B:
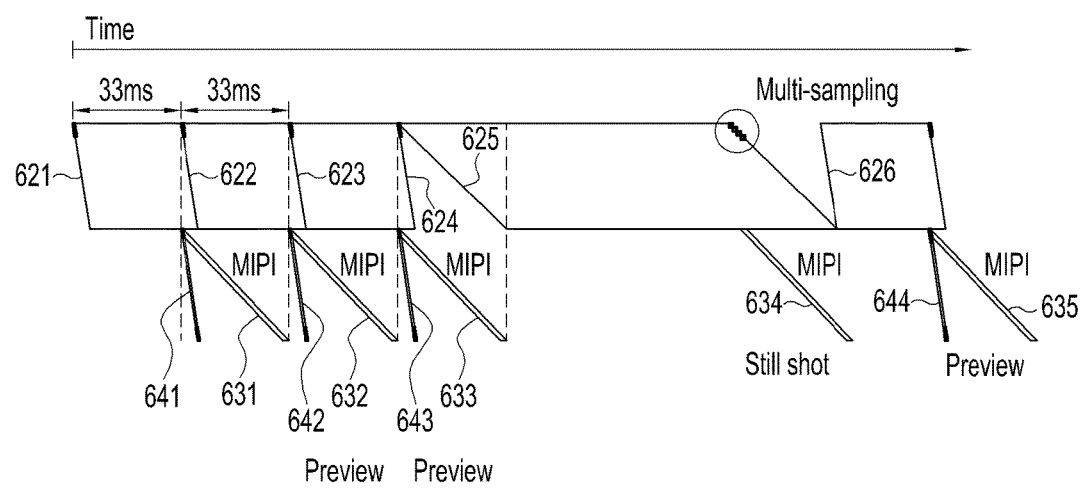
FIG. 6B is a conceptualized view illustrating a read-out speed and an output speed according to an example embodiment of the present disclosure.

FIG. 6B is a conceptualized view illustrating a read-out speed and an output speed according to an example embodiment of the present disclosure.

For example, the sensor 400 may read out data for a preview image for read-out times 621, 622, 623, and 626, e.g., 33 ms. For example, the y axis and x axis of "621" may be the pixel number or line number and the time, respectively. Thus, the ratio in which the y axis increases relative of the x axis of "621," i.e., the graph slope, may represent the read-out speed. Further, the sensor 400 may read out data for taking a still shot for a relatively long time 625, e.g., multi-sampling. Upon multi-sampling, one ADC may sample analog signals from photodiodes one or more times, and the read-out time may thus be relatively increased. Unless the sensor includes a memory, temporary data storage, i.e., buffering, may not be performed. Thus, the data may be output at the same speed as the read-out speed of the read-out data. In FIG. 6B, "641", "642", "643", and "644" represent data output times of the sensor when the sensor includes no memory. In other words, the slope of "641" may be the same as the slope of "621," which may come from a failure to temporarily store data. According to an example embodiment of the present disclosure, after temporarily storing data read out for the read-out times 621 to 625 in the memory, the sensor 400 may output the data for output times 631 to 635 at an output speed set for the interface (e.g., MIPI). In other words, according to an example embodiment of the present disclosure, the sensor 400 may output data which has been read out for relatively short times 621, 622, and 623, not immediately but rather according to times 631, 632, and 633 defined in accordance with the interface after temporarily storing the data in the memory, enabling the output to be done in compliance with existing interfaces despite high-speed image capturing.

Figure 6C:
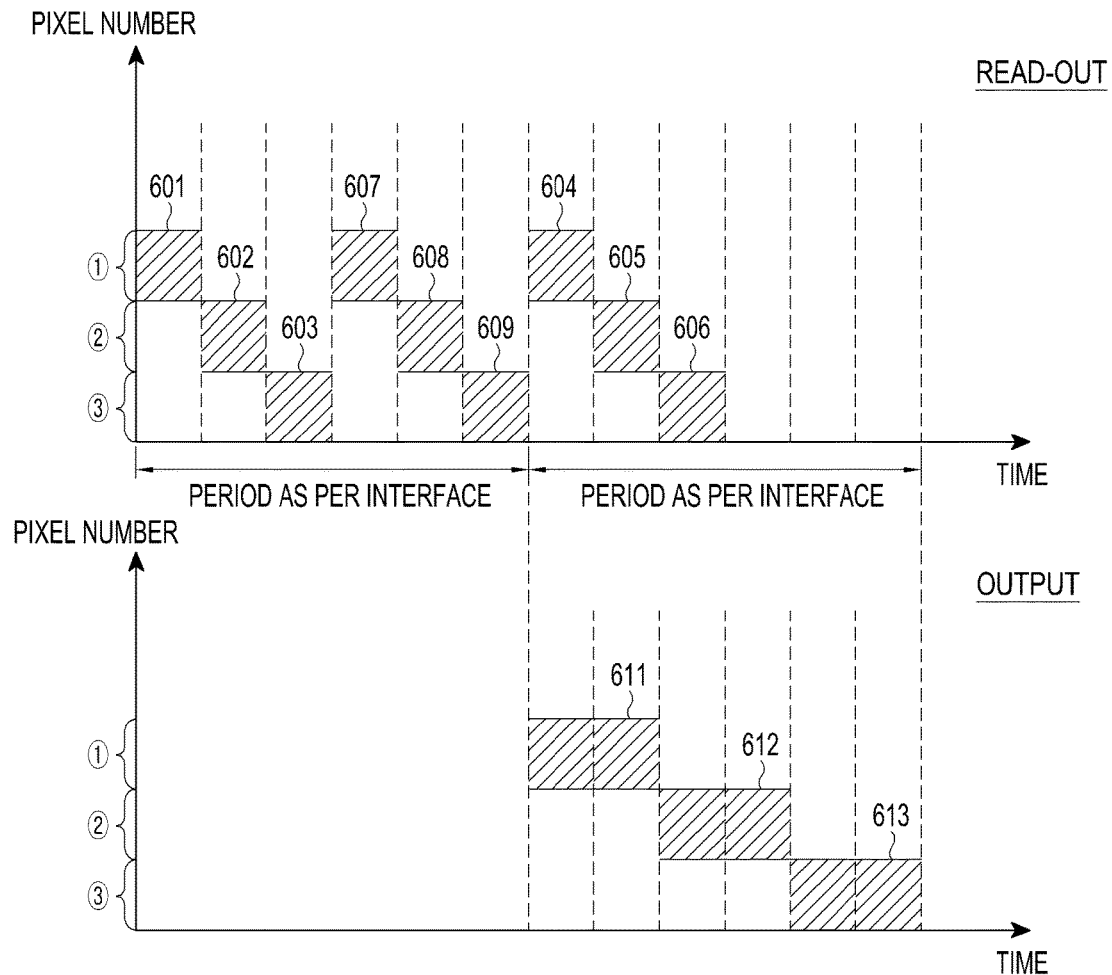
FIG. 6C is a conceptualized view illustrating a read-out speed and an output speed according to an example embodiment of the present disclosure.

FIG. 6C is a conceptualized view illustrating a read-out speed and an output speed according to an example embodiment of the present disclosure. In contrast to the example embodiment of FIG. 6A, according to the example embodiment of FIG. 6C, the sensor 400, after reading out data for one frame for read-out times 601, 602, and 603, may read out data for another frame for read-out times 607, 608, and 609. The sensor 400 may output, at a second speed, one frame generated using the data read out for the read-out times 601, 602, and 603 along with the additional data read out for the read-out times 607, 608, and 609. Alternatively, the sensor 400 may store the data read out for the read-out times 601, 602, and 603 and the data read out for the read-out times 607, 608, and 609 in the memory, and the sensor 400 may output one of the two frames to the outside (e.g., externally) while deleting the non-selected data. Alternatively, the sensor 400 may generate an output frame using the two frames and output the one output frame generated.

Figure 6D:
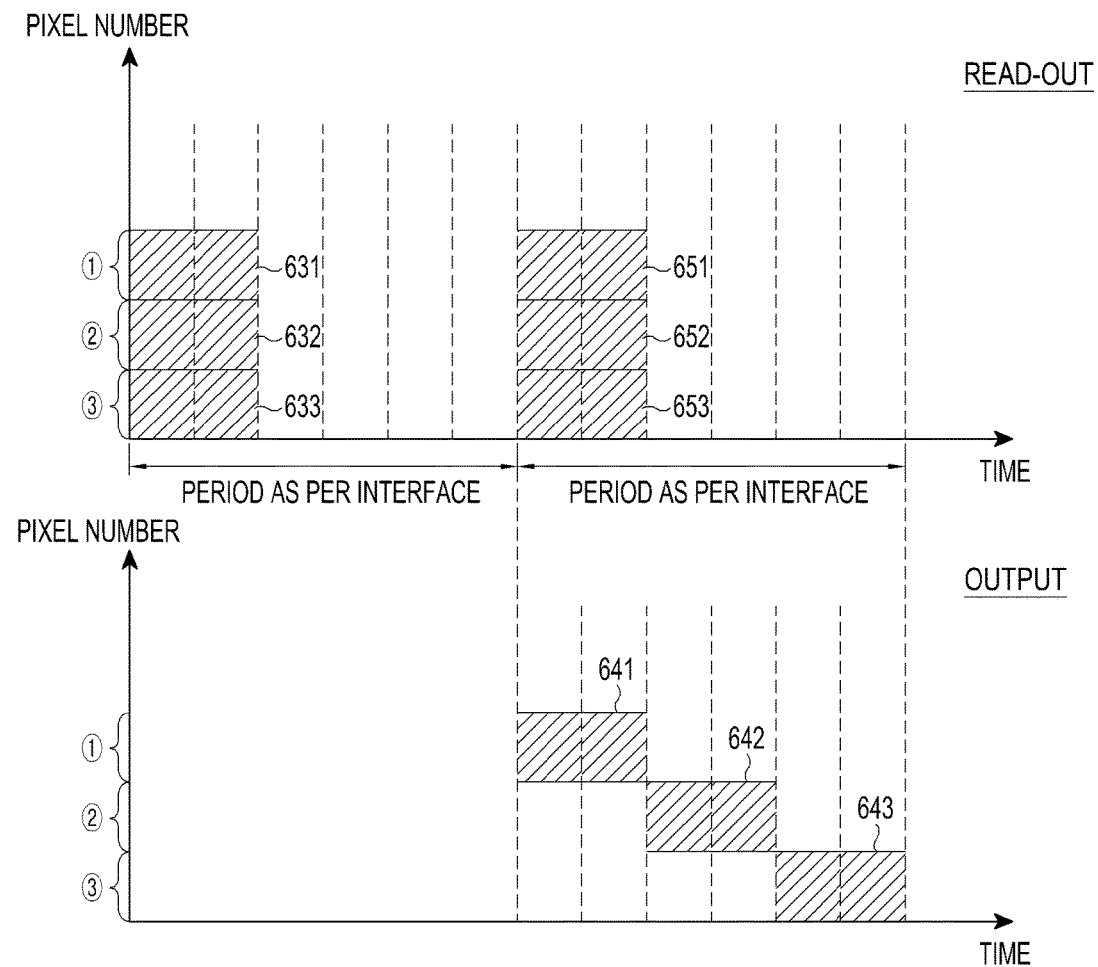
FIG. 6D is a conceptualized view illustrating a read-out speed and an output speed according to an example embodiment of the present disclosure.

FIG. 6D is a conceptualized view illustrating a read-out speed and an output speed according to an example embodiment of the present disclosure. In the embodiment of FIG. 6D, the sensor 400 may set the read-out time 631 of first data as two unit times, the read-out time 632 of second data as two unit times, and the read-out time 633 of third data as two unit times. The sensor 400 may simultaneously perform the read-out of the first data, the read-out of the second data, and the read-out of the third data. For example, the read-out circuit may include a plurality of ADCs. Each of the plurality of ADCs may process, in parallel, the read-out of the first data, the read-out of the second data, and the read-out of the third data, and, thus, the read-outs of the plurality of data items may take two unit times. As set forth above, the parallel read-out processing allows the read-outs to be performed within a relatively shorter time than the six unit times. In other words, a high-speed read-out may be carried out.

The sensor 400 may store the plurality of data items read out for the read-out times 631, 632, and 633 and output the stored data for output times 641, 642, and 643, e.g., six unit times. As described above, the sensor 400 may output data for a period of time (e.g., six unit times) in accordance with the interface or output speed in accordance with the interface. Meanwhile, the sensor 400 may perform parallel read-outs on data for a next frame for the read-out times 651, 652, and 653 while outputting data.

Meanwhile, although an example is shown in which the sensor 400 performs data read-outs for the read-out times 631, 632, and 633, i.e., two unit times, and perform no other operations for the other four unit times, this is merely an example. The sensor 400 may perform an additional data read-out for two unit times. The additional data read out may be deleted after having temporarily been stored or may be used to generate a final frame to be output.

Figure 6E:
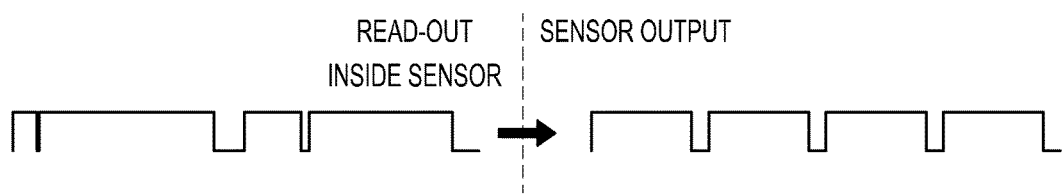
FIG. 6E is a graph illustrating comparison between a read-out speed and an output speed according to an example embodiment of the present disclosure.

FIG. 6E is a graph illustrating comparison between a read-out speed and an output speed according to an example embodiment of the present disclosure. As described above, according to an example embodiment of the present disclosure, the sensor 400 may include a memory able to temporarily store read-out data, and the sensor 400 may thus output data at a constant output speed as shown in FIG. 6E. Therefore, the read-out speed inside the sensor may freely be set and be adjusted as per the processing task required regardless of the output speed required for the interface.

Figure 7:
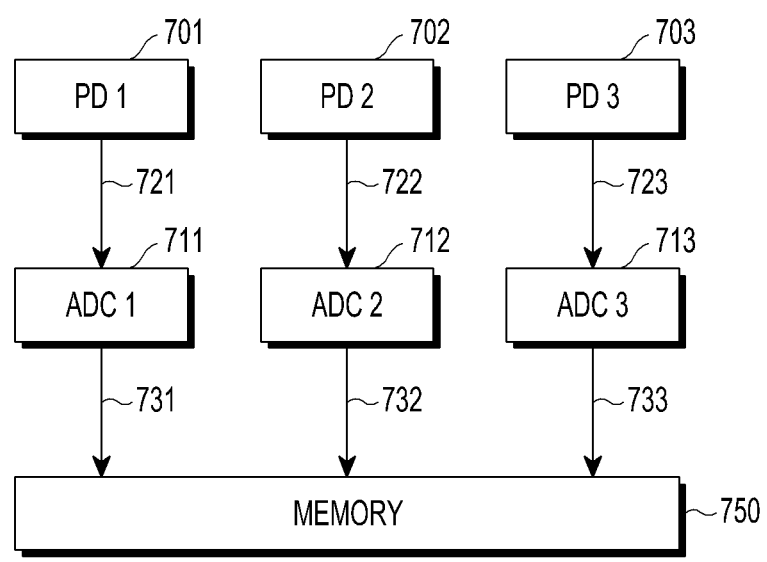
FIG. 7 is a conceptualized view illustrating a read-out parallel process according to an example embodiment of the present disclosure.

FIG. 7 is a conceptualized view illustrating a read-out parallel process according to an example embodiment of the present disclosure.

Referring to FIG. 7, a plurality of photodiodes 701, 702, and 703 may be arranged in a pixel array. Each photodiode 701 of FIG. 7 may also refer to, e.g., a photodiode line. In other words, the photodiode 701 may refer to one photodiode line, and the photodiode 702 may refer to another photodiode line. Further, the read-out circuit of the sensor 400 may include a plurality of ADCs 711, 712, and 713, and the sensor 400 may include a memory 750. The photodiodes 701, 702, and 703 may convert received light into analog electrical signals 721, 722, and 723, respectively, and output the analog electrical signals. Meanwhile, although not shown, the sensor 400 may further include a capacitor capable of temporarily storing electric charges that are output from the plurality of photodiodes 701, 702, and 703. Meanwhile, a first photodiode 701, e.g., a first photodiode line, may be connected with a first ADC 711, a second photodiode 702, e.g., a second photodiode line, may be connected with a second ADC 712, and a third photodiode 703, e.g., a third photodiode line, may be connected with a third ADC 713. Although not shown, the sensor 400 may further include a switching circuit for controlling connections between the plurality of photodiodes 701, 702, and 703 and the ADCs 711, 712, and 713. The sensor 400 may control the connected state of the switching circuit using control signals from an external processor for computation or a computation circuit included therein. The plurality of ADCs 711, 712, and 713, respectively, may convert the received analog electrical signals 721, 722, and 723 into digital electrical signals 731, 732, and 733 and output the digital electrical signals. The ADCs 711, 712, and 713 may perform conversion substantially simultaneously, i.e, in parallel, thus reducing the overall time required for conversion.

Figure 8:
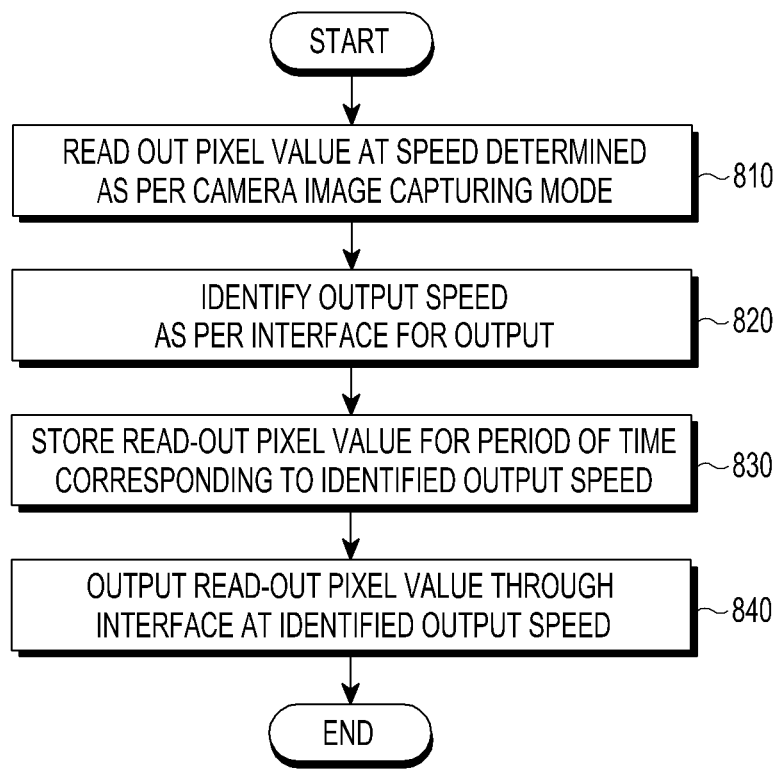
FIG. 8 is a flowchart illustrating a method for controlling an electronic device according to an example embodiment of the present disclosure.

FIG. 8 is a flowchart illustrating a method for controlling a sensor according to an example embodiment of the present disclosure.

In operation 810, the sensor 400 may read out a pixel value at a speed determined as per a camera image capturing mode. For example, the sensor 400 may determine that a high-speed image capturing mode is the image capturing mode. The high-speed image capturing mode may be selected by the user or automatically upon detecting an event set by the sensor 400. The high-speed image capturing mode may be an image capturing mode in which one image frame is captured at a relatively high speed. For example, the sensor 400 may include a plurality of ADCs, and the sensor 400 may read out one frame at a relatively high speed by parallel-processing the read-out of at least two or more of a plurality of pixels. In this case, the sensor 400 may perform the read-out at a first speed.

In operation 820, the sensor 400 may identify the output speed as per the interface for output. For example, the sensor 400 may identify that the output speed of the interface for output is a second speed. According to an example embodiment of the present disclosure, an external processor of the sensor 400 may identify the output speed of the interface for output and control the output speed of the memory in the sensor 400 based on the identified output speed. In operation 830, the sensor 400 may store the pixel value read out for the period of time corresponding to the identified output speed. In operation 840, the sensor 400 may output the read-out pixel value through the interface at the identified output speed. Accordingly, the data read out at a relatively high speed in the high-speed image capturing mode may be stored in the memory for a period of time set as per the interface, rather than being output simultaneously with the read-out. Consequently, the sensor 400 may output data at the output speed set as per the interface. Meanwhile, the sensor 400 may also perform image capturing in a multi-sampling image capturing mode other than the high-speed image capturing mode, which is described below in greater detail with reference to FIG. 9.

Figure 9:
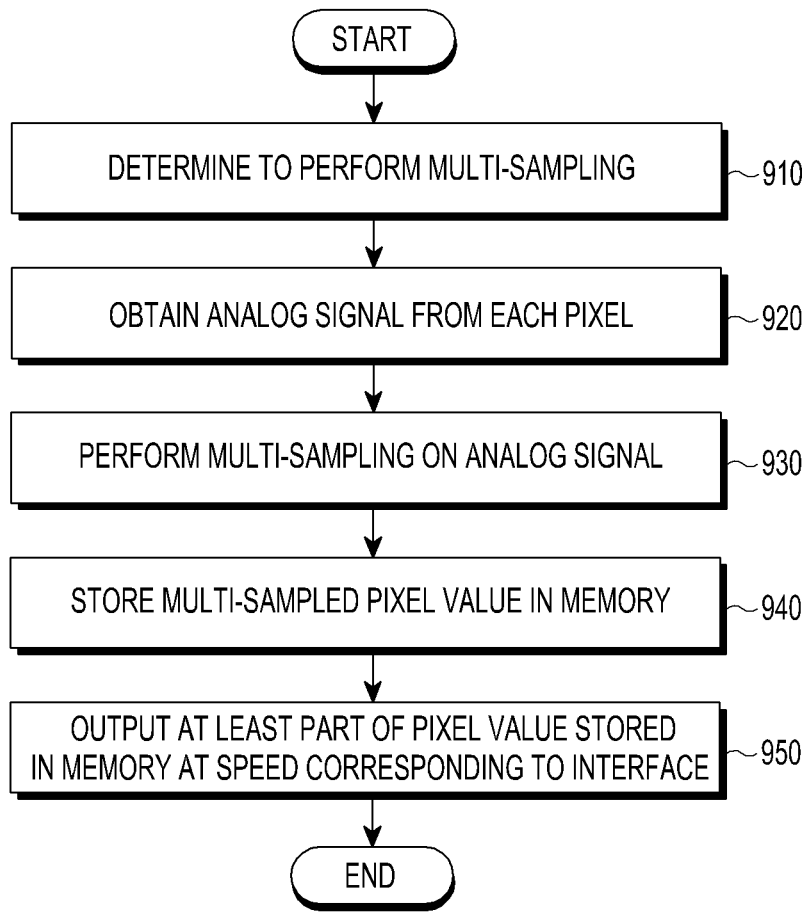
FIG. 9 is a flowchart illustrating a multi-sampling operation according to an example embodiment of the present disclosure.
Figure 10A:
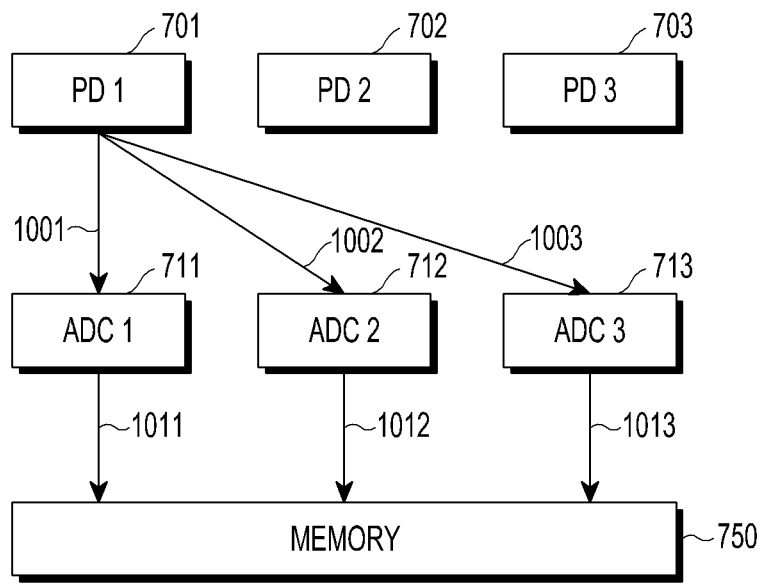
FIG. 10A is a conceptualized view illustrating connection between photodiodes and an ADC when a multi-sampling operation is performed according to an example embodiment of the present disclosure.
Figure 10B:
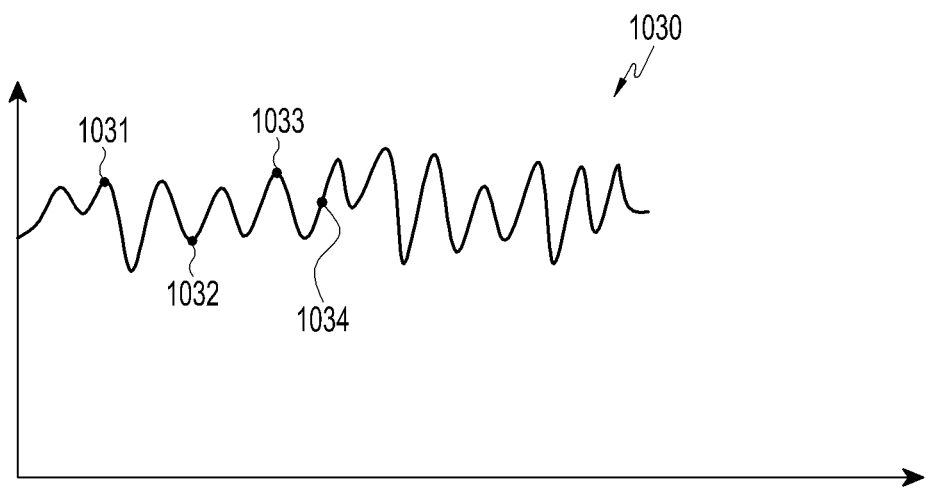
FIGS. 10B, 10C, and 10D are conceptualized views illustrating multi-sampling, according to an example embodiment of the present disclosure.
Figure 10C:
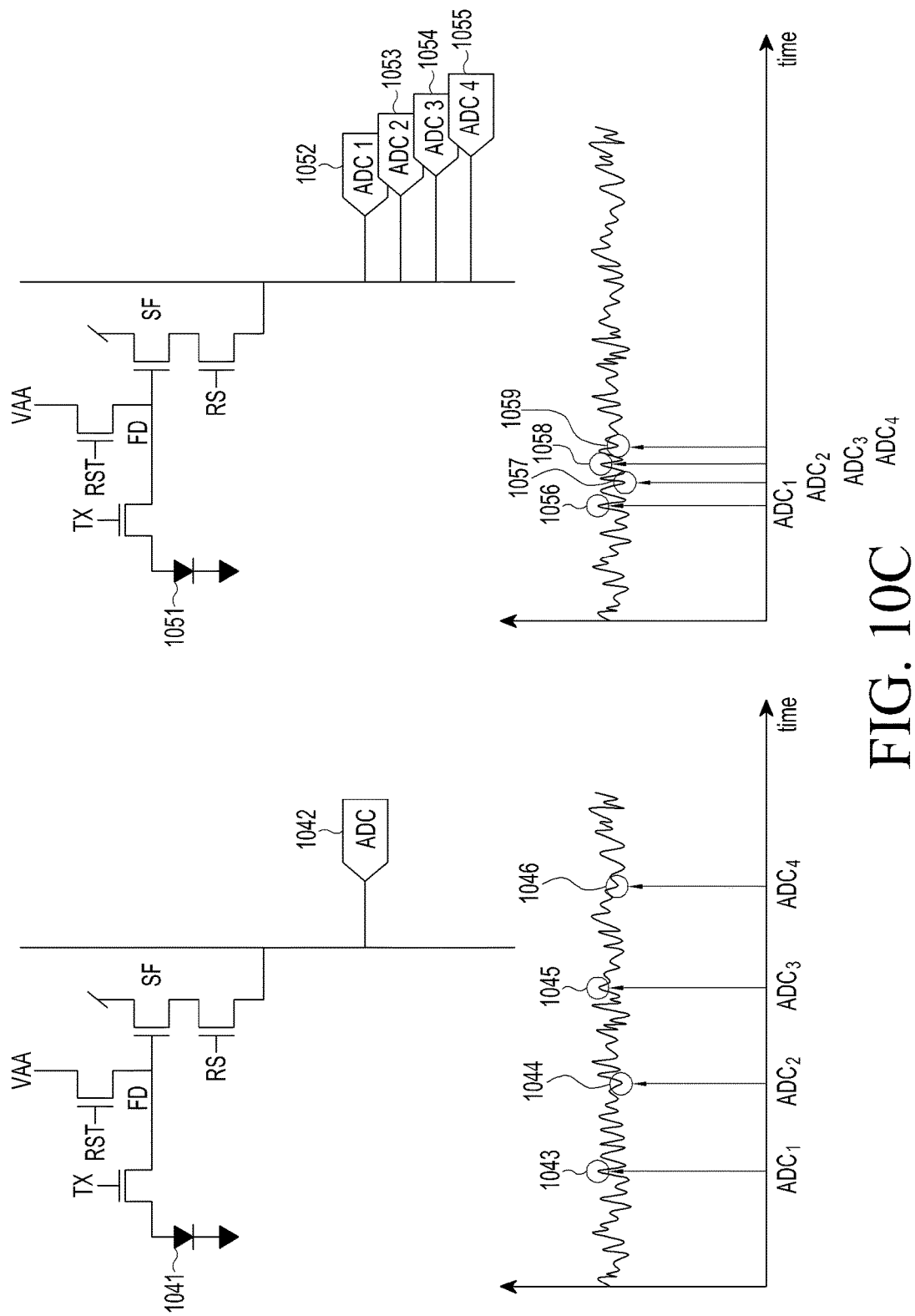
Figure 10D:
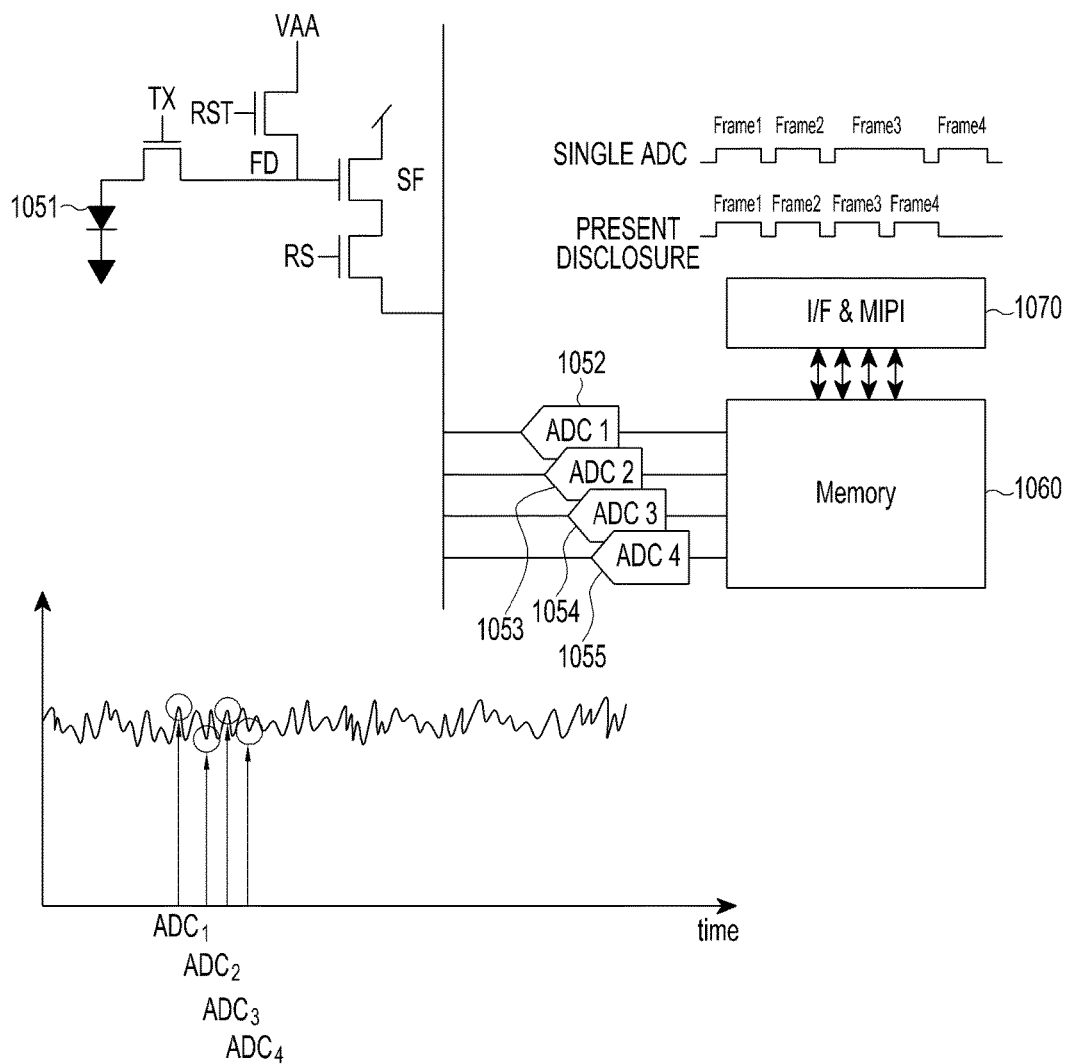

FIG. 9 is a flowchart illustrating a multi-sampling operation according to an example embodiment of the present disclosure. The embodiment of FIG. 9 is described in greater detail with reference to FIGS. 10A, 10B, 10C, and 10D. FIG. 10A is a conceptualized view illustrating connections between photodiodes and an ADC when a multi-sampling operation is performed according to an example embodiment of the present disclosure. FIGS. 10B, 10C, and 10D are conceptualized views illustrating multi-sampling, according to an example embodiment of the present disclosure.

In operation 910, the sensor 400 may determine to perform a multi-sampling operation. In other words, the sensor 400 may determine that the image capturing mode is a multi-sampling mode. In a low-illuminance environment, the sensor 400 may determine that the image capturing mode is the multi-sampling mode. For example, the sensor 400 may sense the amount of outside (ambient) light, and upon determining that the sensed amount of outside light is less than a threshold, the sensor 400 may determine that the image capturing mode is the multi-sampling mode. Alternatively, the sensor 400 may be operated in the multi-sampling mode by a user selection.

In operation 920, the sensor 400 may obtain an analog signal from each pixel. For example, the sensor 400 may connect a plurality of ADCs 711, 712, and 713 to the first photodiode 701 as shown in FIG. 10A. As described above, the sensor 400 may include a switching circuit capable of controlling the connected state between the photodiodes 701, 702, and 703 and the ADCs, and as the switching circuit is controlled, the connected state may be varied as shown in FIG. 10A. The plurality of ADCs 711, 712, and 713, respectively, may convert analog electrical signals 1001, 1002, and 1003 from the first photodiode 701 into digital electrical signals 1011, 1012, and 1013. Although the analog electrical signals 1001, 1002, and 1003 are substantially the same, the digital electrical signals 1011, 1012, and 1013 may be substantially different from each other. For example, each ADC may receive an analog electrical signal denoted as "1030" as shown in FIG. 10B. The analog electrical signal 1030 may contain noise, the magnitude of which may be relatively increased upon low-illuminance image capturing. Accordingly, when the ADC samples the electrical signal 1030 and identifies the sampled values, the sampled values may be varied depending on the periods at which the sampling is performed. For example, the ADC may perform sampling in various positions 1031, 1032, 1033, and 1034, and the converted digital electrical signals may differ in value depending on the sampling positions. As set forth above, when the sensor 400 performs image capturing in a relatively low-illuminance environment, the digital electrical signals may present larger differences in value based on the differences in sampling position. Meanwhile, the sensor 400 may perform sampling in each of the plurality of positions 1031, 1032, 1033, and 1034 of the analog signal and determine that the mean of the resultant values is a converted value, in which case errors due to noise may be reduced. Such method of determining a converted value by sampling one analog signal multiple times and compiling the results may be denoted multi-sampling. Conventional sensors having a single ADC, upon performing analog-digital conversion for multi-sampling, may increase the read-out time. According to an example embodiment of the present disclosure, the sensor 400 may perform, in parallel, sampling a single analog signal and converting the analog signal into a digital value using multiple ADCs, reducing the time required for multi-sampling. The memory 750 may store the digital values multi-sampled, in parallel, by the ADCs 711, 712, and 713 and output the digital values to the outside (externally). Meanwhile, the sensor 400 may further include an additional computation circuit that may average the multi-sampled digital values and output the result to the outside. Also in this case, the memory 750 may output the multi-sampled digital values, or the mean determined based on the multi-sampling, to the outside, as per the output speed set according to the interface. The process of sampling an analog signal from a photodiode multiple times, converting into digital signals, and generating a final digital signal based on the results of the conversion may be denoted multi-sampling, as described above. The read-out speed and output speed upon multi-sampling are described below in greater detail with reference to FIG. 11A.

In operation 930, the sensor 400 may perform multi-sampling on the analog signal obtained from the pixel. In operation 940, the sensor 400 may store the multi-sampled pixel values in the memory. In operation 950, the sensor 400 may output at least some of the pixel values stored in the memory at a speed corresponding to the interface. As set forth above, according to an example embodiment of the present disclosure, the sensor 400 may perform multi-sampling using a plurality of ADCs 711, 712, and 713, enabling read-out at a relatively high speed. For example, the sensor 400 may perform read-out at a speed higher than the output speed set according to the interface for output, and thus, the sensor 400 may output data at the output speed set for the interface after temporarily storing the data in the memory.

Meanwhile, the low-illuminance image capturing mode may be referred to as a low-noise mode, in which case a different gain, exposure time, and auto focusing (AF) may be set than in the normal image capturing mode. Further, according to an example embodiment of the present disclosure, the sensor 400 may be operated in the low-illuminance image capturing mode by simply controlling the switching circuit between the photodiodes and the read-out circuit, without switching between interface-related modes, enabling a seamless switch between the low-illuminance image capturing mode and the normal image capturing mode.

FIG. 10C is a conceptualized view illustrating a sensor according to an example embodiment of the present disclosure. The left part of FIG. 10C illustrates the concept of a sensor having one ADC. The unit pixel of the sensor may include an optoelectronic conversion diode 1041, a transfer transistor TX, a source follower transistor SF, a reset transistor RST, and a selection transistor RS.

The transfer transistor TX, the source follower transistor SF, the reset transistor RST, and the selection transistor RS, respectively, may include a transfer gate, a source follower gate, a reset gate, and a selection gate. The optoelectronic conversion diode 1041 may be a photodiode including a N-type impurity region and a P-type impurity region. The drain of the transfer transistor TX may be understood to be a floating diffusion (FD) region. The FD region may be the source of the reset transistor RST. The FD region may be electrically connected with the source follower gate of the source follower transistor SF. The source follower transistor SF is connected with the selection transistor RS. The reset transistor RST, the source follower transistor SF, and the selection transistor RS may be shared by the optoelectronic conversion diode 1041 in the pixel or neighboring pixels, thereby leading to enhanced integration.

The electric charges remaining in the FD region may be discharged by applying a power voltage VAA to the drain of the reset transistor RST and turning on the reset transistor RST with light shut off. Thereafter, electron-hole pairs may be generated in the optoelectronic conversion diode 1041 by turning off the reset transistor RST and allowing external light to be incident onto the optoelectronic conversion diode 1041. Holes may move and accumulate in the P-type impurity region, and electrons may move and accumulate in the N-type impurity region. As the transfer transistor TX turns on, electrons and holes may move and accumulate in the FD region. An electrical signal from the optoelectronic conversion diode 1041 may be input to the ADC 1042. The ADC 1042 may perform analog-digital conversion on the electrical signal one time. In proportion to the amount of electric charges accumulated, the gate bias of the source follower transistor SF is varied, causing a variation in the source potential of the source follower transistor SF. At this time, turning on the selection transistor RS enables the signal to be read out by the electric charge through the column line. Meanwhile, the ADC 1042 and the plurality of transistors TX, RST, SF, and RS may be operated at a relatively high speed. In this case, the ADC 1042 may convert the obtained analog electrical signal in multiple positions 1043, 1044, 1045, and 1046 at a relatively high speed. In such case, the ADC 1042 may read out the digital electrical signal, i.e., digital data, at a relatively high speed and store the digital data, which has been read out at a relatively high speed, in the memory. The memory may output the stored data at the output speed set according to the interface. Alternatively, the sensor may perform control to average data values and output the mean at the output speed set according to the interface. In this case, the sensor may further include a computation circuit that may average the data values.

On the other hand, the right part of FIG. 10C illustrates a sensor including a plurality of ADCs 1052, 1053, 1054, and 1055. An optoelectronic conversion diode 1051, or an optoelectronic conversion diode 1051 of FIG. 10D, may be operated in substantially the same manner as the optoelectronic conversion diode 1041. Further, a plurality of transistors TX, RST, SF, and RS may also be operated in substantially the same way as those shown on the left part of FIG. 10C, and no further detailed description thereof is presented. The plurality of ADCs 1052, 1053, 1054, and 1055 may perform conversion in parallel. The ADCs 1052, 1053, 1054, and 1055 may perform sampling on an inputted analog electrical signal in multiple positions 1056, 1057, 1058, and 1059 for substantially the same time. Accordingly, the sensor may perform read-out at a relatively high speed and store the digital data or the mean in the memory. For example, the sensor may average the digital values obtained by conversion by the plurality of ADCs 1052, 1053, 1054, and 1055 and temporarily store the mean in the memory. The sensor may output the digital data or mean stored in the memory from the memory at the output speed set according to the interface. For example, as shown in FIG. 10D, the memory 1060 may temporarily store digital values converted by the plurality of ADCs 1052, 1053, 1054, and 1055. Alternatively, the sensor may further include a computation circuit capable of an averaging operation between the ADCs 1052, 1053, 1054, and 1055. The computation circuit may perform the averaging operation on the digital data from the ADCs 1052, 1053, 1054, and 1055 and output to the memory 1060. The memory 1060 may store the mean and output the mean through the interface 1070 at the output speed set according to the interface 1070. Alternatively, a computation circuit may be placed between the memory 1060 and the interface 1070. The computation circuit may average the values of data output from the memory 1060 and output the mean through the interface 1070. Thus, in contrast to sensors having a single ADC that performs conversion at a relatively low speed, wherein a longer output time is required due to a longer sampling time for one frame, a sensor having multiple ADCs, according to an example embodiment of the present disclosure, may output a frame for a period of time set according to the interface despite performing multi-sampling on one frame. Meanwhile, the circuit shown in FIG. 10C is simply an example, and a sensor according to an example embodiment of the present disclosure may include a photodiode and ADC which are implemented in various circuits and a circuit configuration that connects the photodiode and the ADC. Meanwhile, according to an example embodiment of the present disclosure, only some of the ADCs 1052, 1053, 1054, and 1055 of the sensor may perform multi-sampling. For example, the ADCs 1052 and 1053 alone may perform multi-sampling in which case the other ADCs 1054 and 1055 may perform no other operations. The sensor may perform multi-sampling using only some of the ADCs 1052, 1053, 1054, and 1055 given, e.g., power consumption. In this case, some ADCs 1052 and 1053 may perform sampling multiple times. For example, where such setting has been made that sampling is performed on one analog signal four times, some ADCs 1052 and 1053 each may continuously perform sampling two times, enabling sampling four times in total.

Figure 11A:
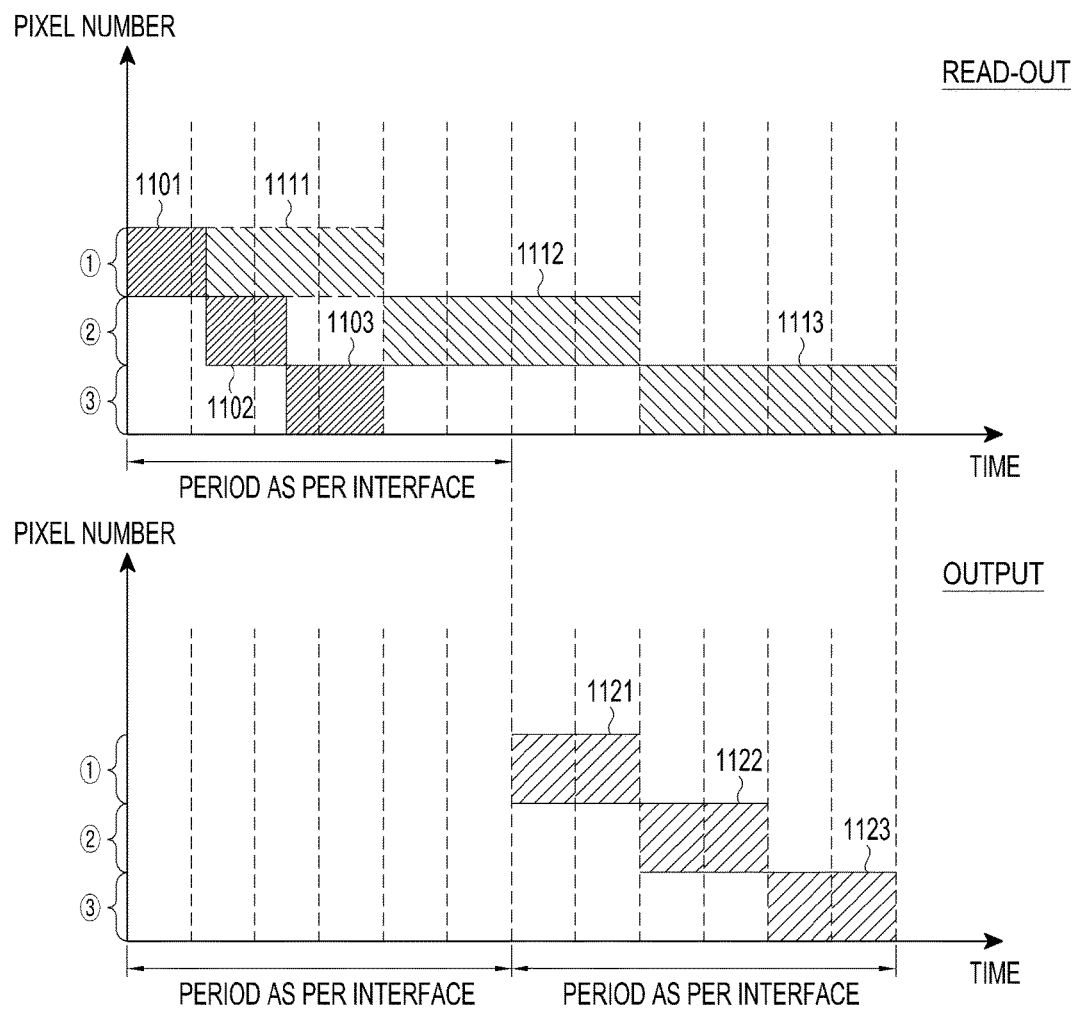
FIG. 11A is a conceptualized view illustrating a read-out time and an output time by multi-sampling according to an example embodiment of the present disclosure.

FIG. 11A is a conceptualized view illustrating a read-out time and an output time by multi-sampling according to an example embodiment of the present disclosure.

Figure 11B:
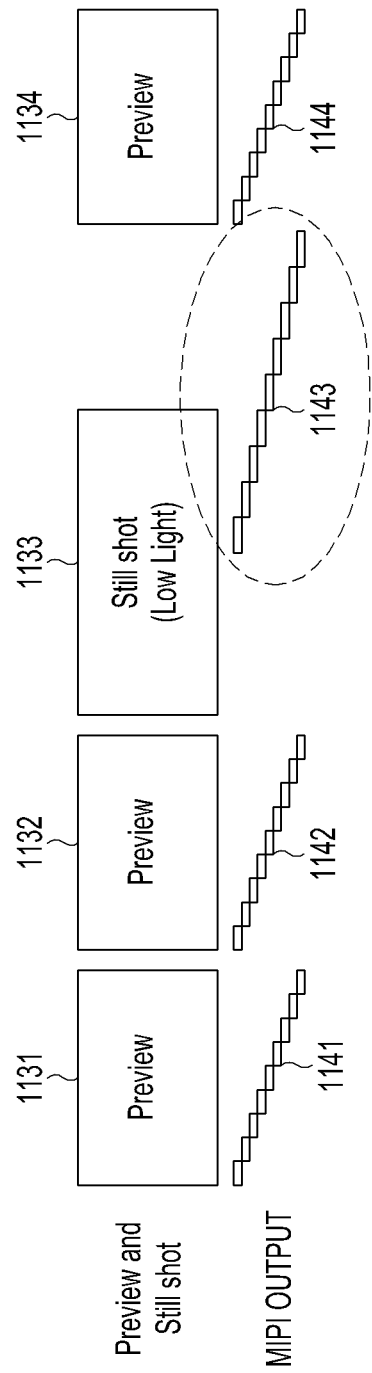
FIG. 11B is a conceptualized view illustrating a time by multi-sampling according to a comparison example for comparison with an example embodiment of the present disclosure.

According to an example embodiment of the present disclosure, the sensor 400 may include a plurality of ADCs. For example, it is assumed that a photodiode is connected with three ADCs for multi-sampling. It is also assumed that it takes four unit times for a single ADC to perform multi-sampling on an analog signal from the photodiode. As three ADCs perform multi-sampling in parallel, the read-out time 1101 of one data item may be, e.g., 4/3 unit times. Further, the read-out times 1101, 1102, and 1103 of the three data items may be, e.g., four unit times. Where the sensor 400 includes one ADC per pixel, first data may be read out for the read-out time 1111, second data may be read out for the read-out time 1112, and third data may be read out for the read-out time 1113. Thus, 12 unit times would be consumed. As set forth above, as the plurality of ADCs of the sensor 400 perform multi-sampling in parallel, one frame may be read out within a relatively short time. Meanwhile, the sensor 400 may store the read-out data in the memory and output the data at the speed set according to the interface. For example, the sensor 400 may output data for the output times 1121, 1122, and 1123 as shown in FIG. 11A. For example, the speed set according to the interface may be ⅙ (frame per unit time), and, accordingly, the sensor 400 may output data over six unit times. FIG. 11B is a conceptualized view illustrating a time by multi-sampling according to a comparison example for comparison with an example embodiment of the present disclosure. Referring to FIG. 11B, the sensor as per the comparison example may capture a plurality of frames 1131 to 1134 and perform multi-sampling on the third frame 1133. In the sensor as per the comparison example, an ADC having a relatively low conversion speed may be connected to the photodiode. Thus, among the frames 1141, 1142, 1143, and 1144 in the sensor as per the comparison example, the frame 1143 that has undergone multi-sampling may be output slower. While the sensor as per the comparison example needs to deal with the slowdown of the output by performing separate mode switching, the sensor according to an example embodiment of the present disclosure may meet the output speed required for the interface, and if necessary, output data at the same speed as before since it performs read-out at a relatively high speed and outputs the read-out data after storing the read-out data in the memory.

Figure 12A:
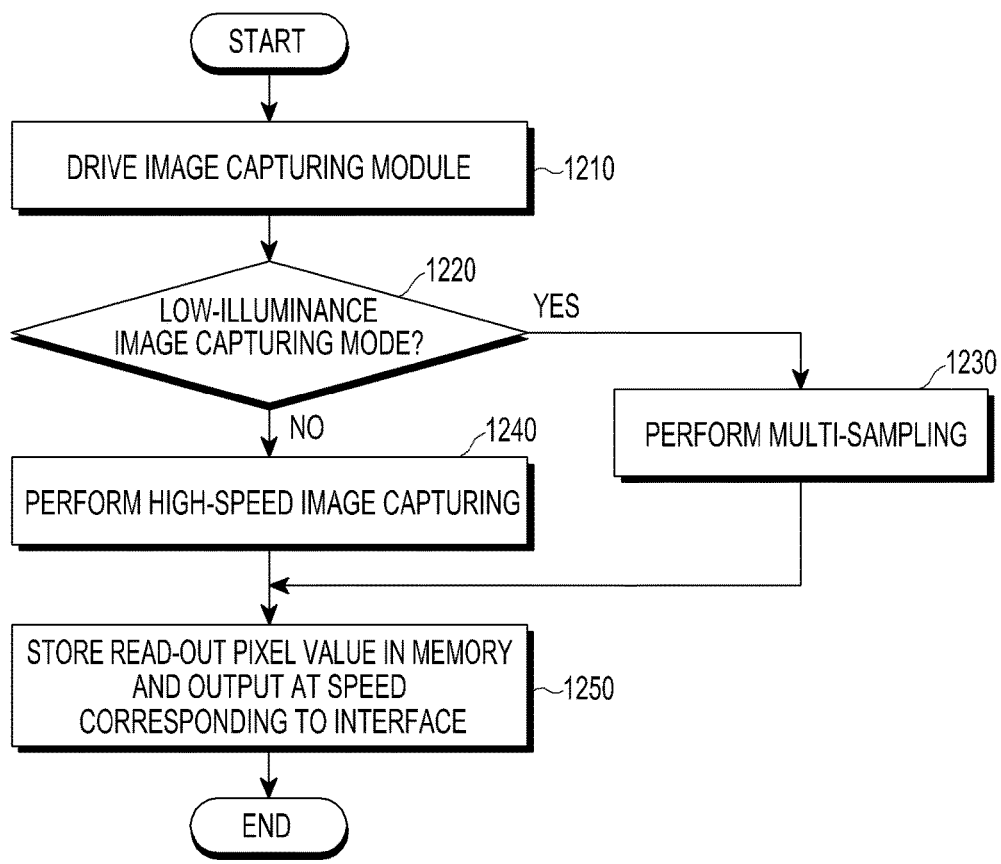
FIGS. 12A and 12B are flowcharts illustrating a method for controlling an electronic device according to an example embodiment of the present disclosure.
Figure 12B:
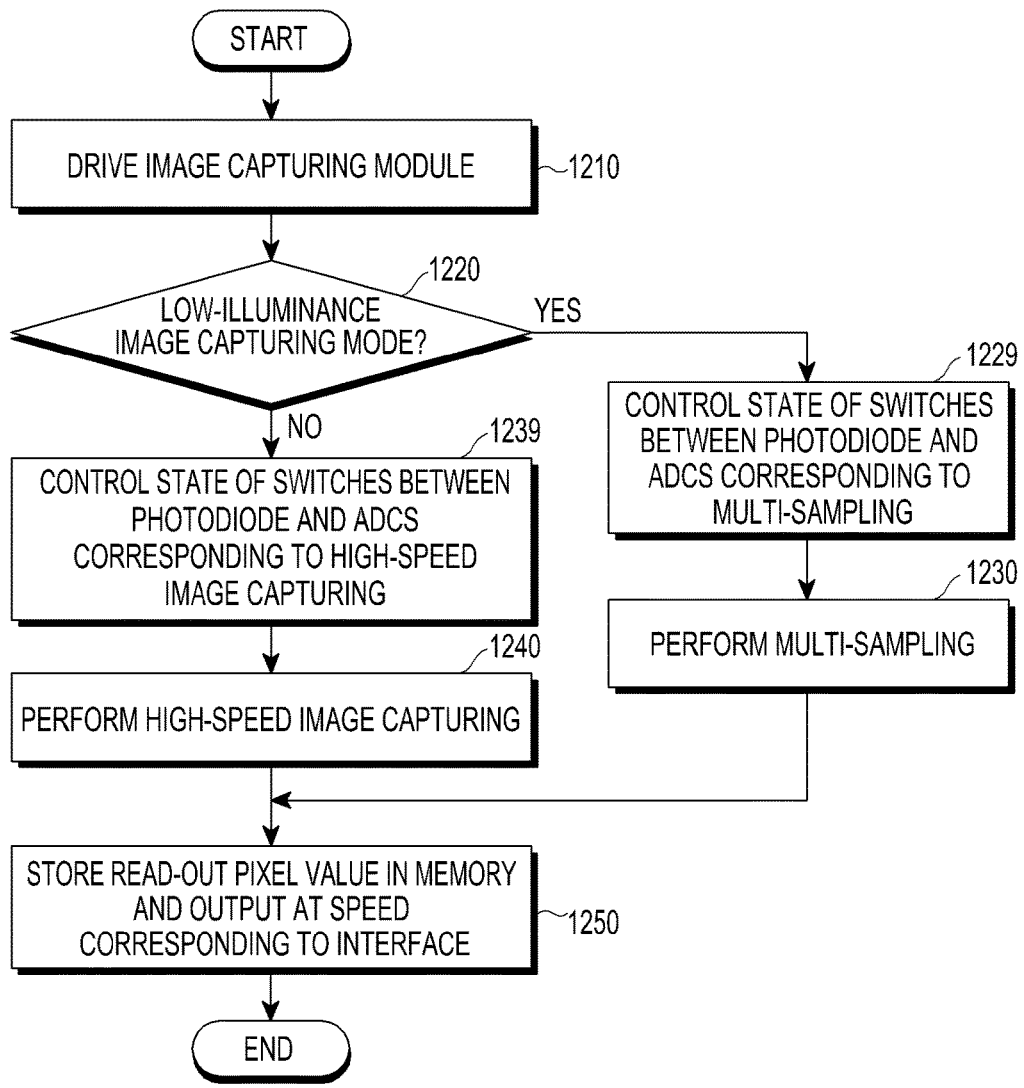

FIGS. 12A and 12B are flowcharts illustrating a method for controlling a sensor according to an example embodiment of the present disclosure.

Referring to FIG. 12A, a sensor may drive an image capturing module in operation 1210. According to an example embodiment of the present disclosure, the sensor may be an image capturing module. In operation 1220, the sensor may determine whether the image capturing mode is the low-illuminance image capturing mode. For example, the sensor may sense the amount of ambient light, and when the amount of light is less than a threshold, the sensor may determine that the image capturing mode is the low-illuminance image capturing mode. Alternatively, the sensor may determine that the image capturing mode is the low-illuminance image capturing mode by a user selection.

Upon determining that the image capturing mode is the low-illuminance image capturing mode, the sensor may perform multi-sampling in operation 1230. According to an example embodiment of the present disclosure, the sensor may connect a plurality of ADCs to the photodiode and perform, in parallel, sampling and conversion on an analog electrical signal output from the photodiode through the plurality of ADCs. Thus, the sensor may perform multi-sampling at a relatively high speed. According to an example embodiment of the present disclosure, the sensor may include an ADC that may perform sampling at a relatively high speed, thereby enabling multi-sampling at a relatively high speed.

Upon determining that the image capturing mode is not the low-illuminance image capturing mode, the sensor may perform high-speed image capturing in operation 1240. Specifically, the sensor may read out data corresponding to one frame at a relatively high speed. According to an example embodiment of the present disclosure, the sensor may process, in parallel, read-out by ADCs, each of which is connected with a respective one of the pixels, thereby enabling read-out at a relatively high speed. According to an example embodiment of the present disclosure, the sensor may include an ADC that may perform sampling and conversion at a relatively high speed, thereby enabling read-out at a relatively high speed. In operation 1250, the sensor may store read-out pixel values in the memory and may output the pixel values at the speed corresponding to the interface.

FIG. 12B is a flowchart illustrating a method for controlling a sensor according to an example embodiment of the present disclosure. As compared with FIG. 12A, FIG. 12B may further include operations 1229 and 1239. The descriptions of the same operations present in FIG. 12A are omitted. Upon determining that the image capturing mode is the low-illuminance image capturing mode at operation 1220, the sensor may control the state of switches between the photodiodes and the ADCs, corresponding to multi-sampling in operation 1229. For example, the sensor may control the switching circuit so that a plurality of ADCs is connected to each photodiode (or photodiode line) as shown in FIG. 10A. Thus, the plurality of ADCs may sample and convert an analog electrical signal output from the photodiode in parallel. Upon determining that the image capturing mode is not the low-illuminance image capturing mode at operation 1220, the sensor may control the state of the switches between the photodiodes and the ADCs, corresponding to high-speed image capturing in operation 1239. For example, the sensor may control the switching circuit so that each photodiode is connected to one ADC as shown in FIG. 7. Thus, each of the plurality of ADCs may, in parallel, convert an analog electrical signal output from a respective one of the photodiodes connected thereto, enabling the read-out of one frame at high speed.

Figure 13:
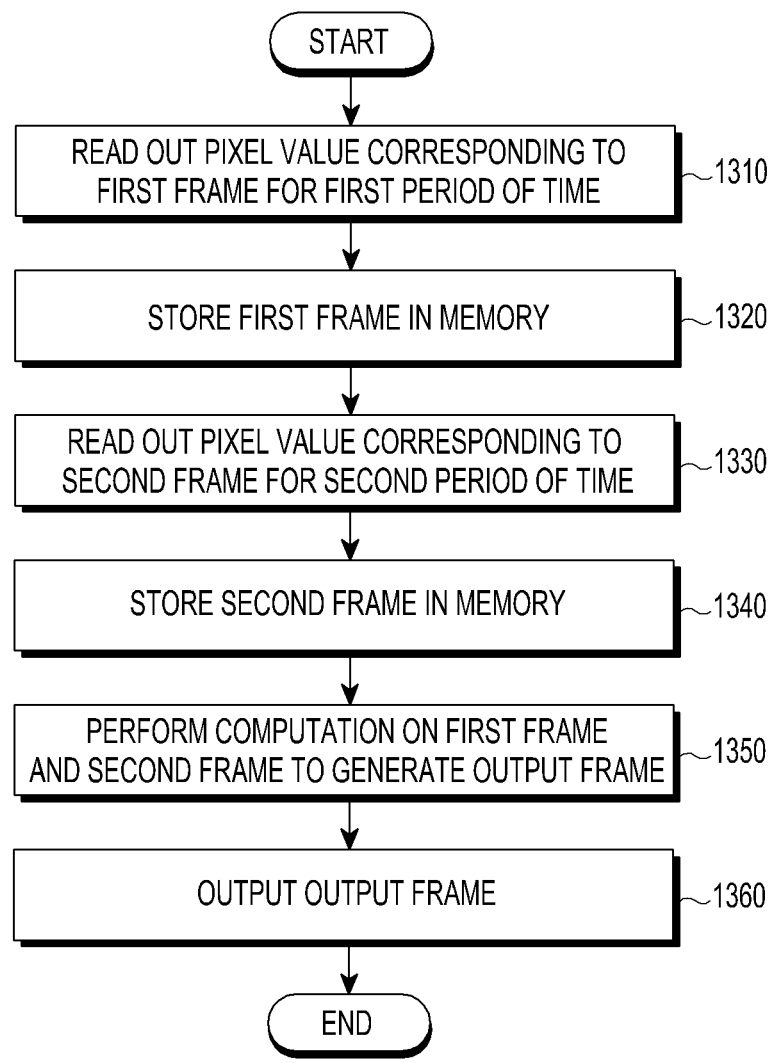
FIG. 13 is a flowchart illustrating a method for controlling an electronic device according to an example embodiment of the present disclosure.
Figure 14A:
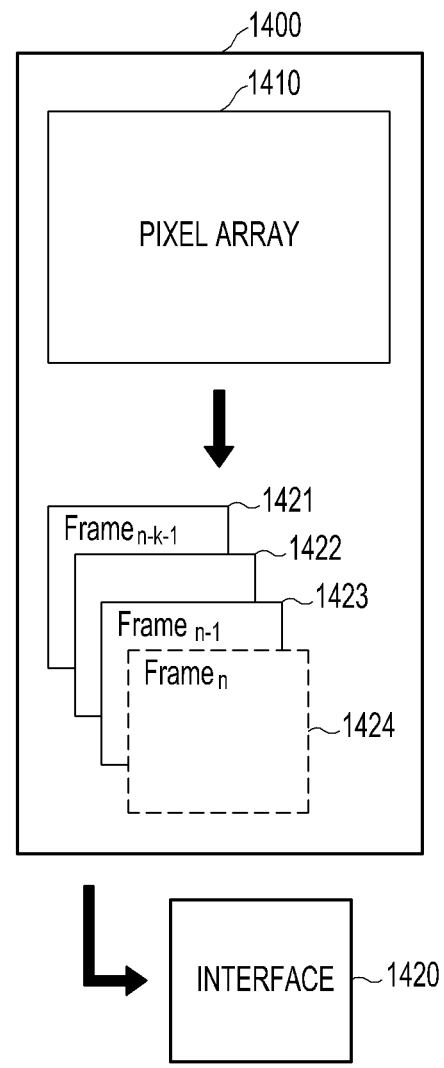
FIG. 14A is a conceptualized view illustrating an example of processing a plurality of frames according to an example embodiment of the present disclosure.

FIG. 13 is a flowchart illustrating a method for controlling a sensor according to an example embodiment of the present disclosure. The embodiment related to FIG. 13 is described in greater detail with reference to FIG. 14A. FIG. 14A is a conceptualized view illustrating an example of processing a plurality of frames according to an embodiment of the present disclosure.

In operation 1310, a sensor may read out a pixel value corresponding to a first frame for a first period of time. In operation 1320, the sensor may store the first frame in the memory. In operation 1330, the sensor may read out a pixel value corresponding to a second frame for a second period of time. In operation 1340, the sensor may store the second frame in the memory. For example, the sensor 1400 may read out pixel values 1421 to 1424 corresponding to the first to nth frames from the pixel array 1410 and store the pixel values in the memory as shown in FIG. 14.

In operation 1350, the sensor may perform computation on the first frame and the second frame, generating an output frame. For example, the sensor may perform a computation process as shown in Equation 1 below:

$$I_{out}=(\alpha_n \text{Frame}_n + \alpha_{n-1} \text{Frame}_{n-1} + \ldots + \alpha_{n-k+1} \text{frame}_{n-k+1})/\text{mdiv} \quad [\text{Equation 1}]$$

In Equation 1 above, $I_{out}$ may be the output frame, an may be the weight for the nth frame $\text{Frame}_n$, mdiv may be the register value that presents the weight for the sum of all, and k may be a positive integer not less than 1. In other words, the sensor may generate the result of a weighted sum for k frames as the output frame. The sensor may assign various weights to each frame depending on image capturing modes. In operation 1360, the sensor may output the output frame. Accordingly, the sensor may output frames captured in various image capturing modes.

Figure 14B:
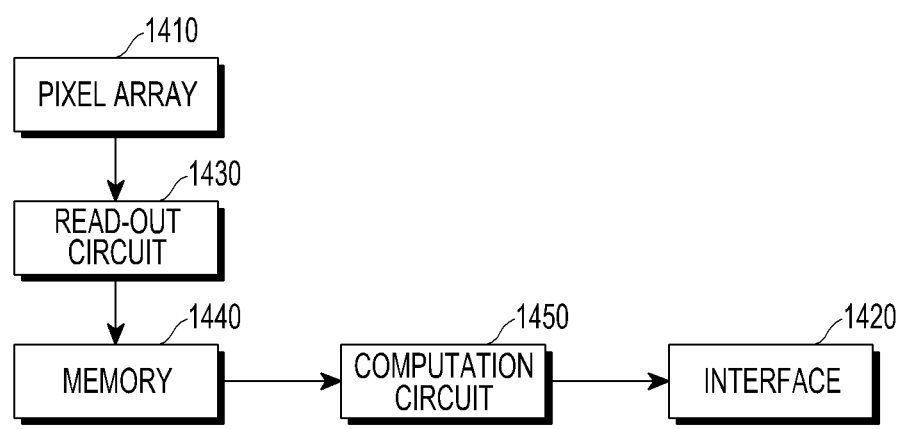
FIG. 14B is a block diagram illustrating an electronic device according to an example embodiment of the present disclosure.

FIG. 14B is a block diagram illustrating a sensor according to an example embodiment of the present disclosure. Referring to FIG. 14B, a sensor may include a pixel array 1410, a read-out circuit 1430, a memory 1440, and a computation circuit 1450, and the sensor may output frames through an interface 1420 to the outside. The read-out circuit 1430 may convert an analog electrical signal output from the pixel array 1410 into a digital electrical signal and store the digital electrical signal in the memory 1440. The read-out circuit 1430 may store a plurality of frames in the memory 1440. The computation circuit 1450 may generate an output frame by performing computation, e.g., a weighted sum operation, on the plurality of frames stored in the memory 1440. The computation circuit 1450 may output the output frame through the interface 1420 to an external device.

Figure 15:
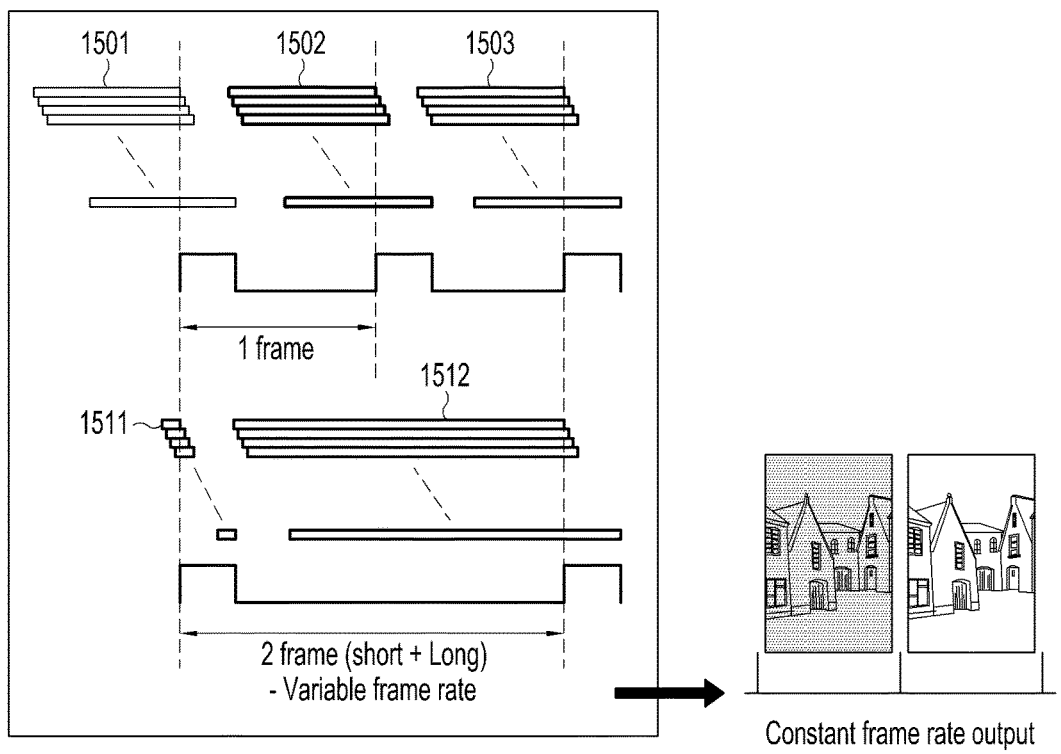
FIG. 15 is a conceptualized view illustrating a process for synthesizing and outputting a plurality of frames according to an example embodiment of the present disclosure.

FIG. 15 is a conceptualized view illustrating a process for synthesizing and outputting a plurality of frames according to an example embodiment of the present disclosure.

For comparison with the present disclosure, a sensor as per the comparison example may output data read out for read-out times 1501, 1502, and 1503 as it is read out. According to an example embodiment of the present disclosure, a sensor may temporarily store data for a plurality of frames in the memory for the read-out times 1511 and 1512 and perform computation on the plurality of frames to output a single frame. Thus, rather than the two images shown on the right part being sequentially output, the output frame generated as the two images shown on the right part are computed may be output. According to an example embodiment of the present disclosure, the sensor may set a different exposure time for each of the data items corresponding to the two frames for the read-out times 1511 and 1512. For example, when the sensor obtains data for the read-out time 1511, the sensor may obtain the frame for a relatively short time, and when the sensor obtains data for the read-out time 1512, the sensor may obtain the frame for a relatively long time. Further, the read-out time, i.e., frame rate, may also be set to be varied. The sensor may output the output frame read out and generated at the output speed set according to the interface. According to an example embodiment of the present disclosure, the sensor may separately output the individual frames stored.

Figure 16A:
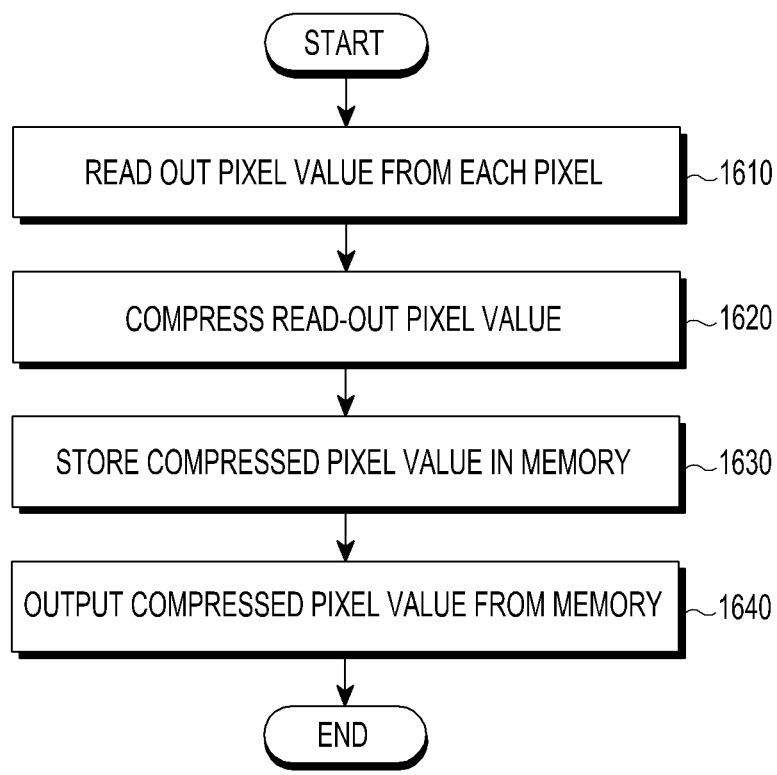
FIGS. 16A and 16B are flowcharts illustrating a method for controlling an electronic device according to an example embodiment of the present disclosure.
Figure 16B:
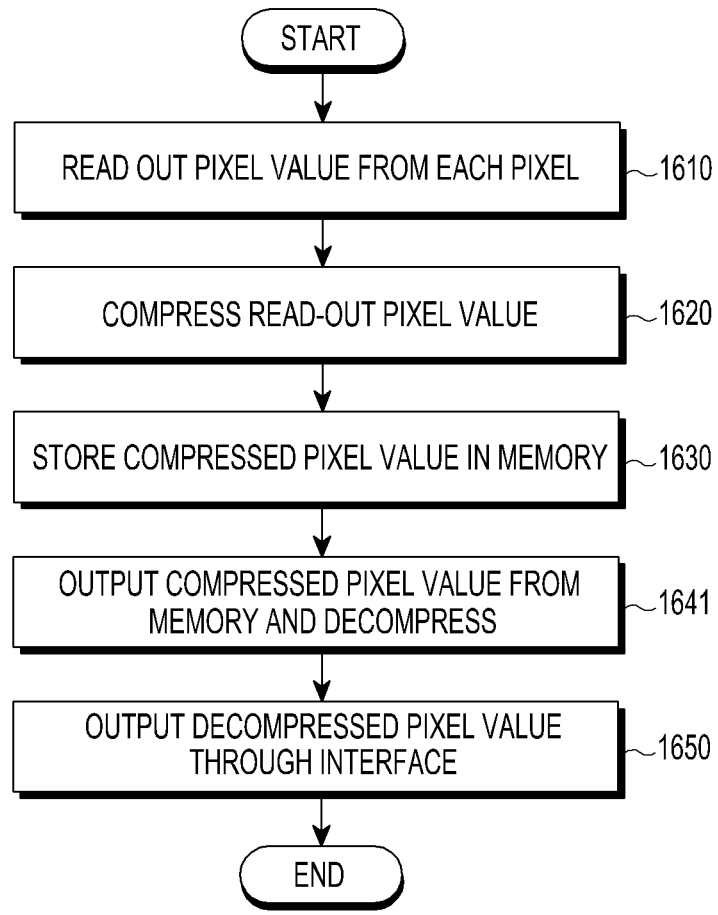
Figure 17:
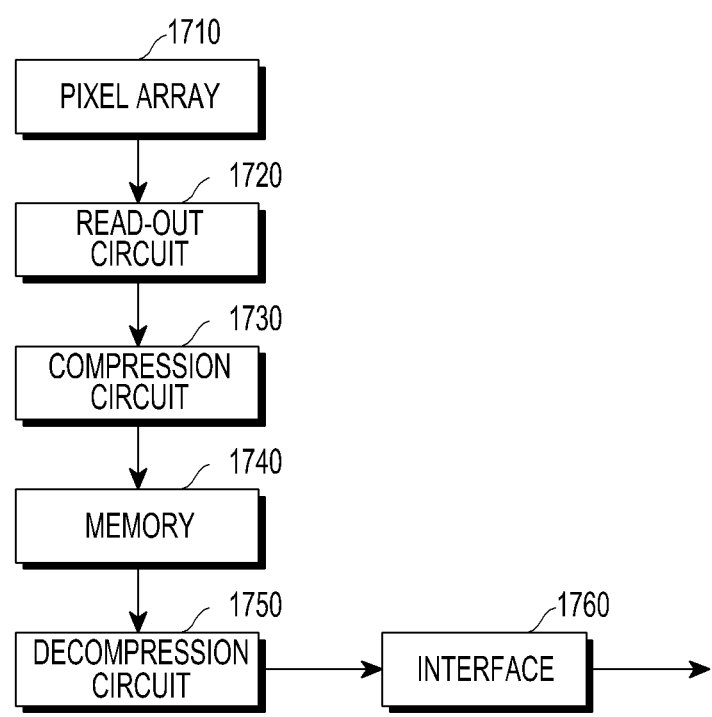
FIG. 17 is a block diagram illustrating an electronic device according to an example embodiment of the present disclosure.

FIGS. 16A and 16B are flowcharts illustrating a method for controlling a sensor according to an example embodiment of the present disclosure. The embodiment shown in FIG. 16A is described in greater detail with reference to FIG. 17. FIG. 17 is a block diagram illustrating a sensor according to an example embodiment of the present disclosure.

In operation 1610, a sensor may read out a pixel value from each pixel. In operation 1620, the sensor may compress the read-out pixel value, i.e., frame. Referring to FIG. 17, the sensor may include a pixel array 1710, a read-out circuit 1720, a compression circuit 1730, a memory 1740, and a decompression circuit 1750, and the sensor may be connected with an external circuit via an interface 1760. The compression circuit 1730 may compress data output from the read-out circuit 1720 using various compression schemes and store the compressed data in the memory 1740. The compression circuit 1730 may compress data output from the read-out circuit 1720 using various compression schemes and output the compressed data to the external circuit. As the per-frame file size may decrease due to the compression, relatively many frames may be stored in the memory 1740. In operation 1630, the sensor may store the compressed pixel value in the memory. In operation 1640, the sensor may output the compressed pixel value from the memory.

Referring to FIG. 16B, the decompression circuit 1750 may decompress the compressed frame and output through the interface 1760 to the outside in operation 1641. According to an example embodiment of the present disclosure, the decompression circuit 1750 may decompress the compressed frame and output the decompressed frame to the external circuit.

According to an example embodiment of the present disclosure, a method for controlling a sensor including a plurality of pixels and a memory may comprise converting an analog electrical signal output from each of the plurality of pixels into a digital electrical signal, temporarily storing the digital electrical signal in the memory, and outputting at least part of the temporarily stored digital electrical signal to an external circuit.

According to an example embodiment of the present disclosure, converting the analog electrical signal into the digital electrical signal may include receiving the analog electrical signal from each of the plurality of pixels at a first speed and converting the analog electrical signal into the digital electrical signal, and outputting the at least part of the temporarily stored digital electrical signal to the external circuit may include outputting the at least part of the temporarily stored digital electrical signal to the external circuit at a second speed.

According to an example embodiment of the present disclosure, the second speed may be a speed set according to an interface for data communication between the sensor and the external circuit.

According to an example embodiment of the present disclosure, converting the analog electrical signal output from each of the plurality of pixels into the digital electrical signal may be performed by performing in parallel, multiple times, conversion of a first analog electrical signal output from one of a plurality of photodiodes included in the plurality of pixels into a first digital electrical signal when an image capturing mode is a low-illuminance image capturing mode.

According to an example embodiment of the present disclosure, converting the analog electrical signal output from each of the plurality of pixels into the digital electrical signal may be performed by performing, in parallel, conversion of a second analog electrical signal output from each of a plurality of photodiodes included in the plurality of pixels into a second digital electrical signal when an image capturing mode is a high-speed image capturing mode.

According to an example embodiment of the present disclosure, temporarily storing the digital electrical signal in the memory may include storing a first digital electrical signal corresponding to a first frame and storing a second digital electrical signal corresponding to a second frame.

According to an example embodiment of the present disclosure, the method may further comprise generating an output frame using the first digital electrical signal and the second digital electrical signal and outputting the generated output frame to the external device.

According to an example embodiment of the present disclosure, generating the output frame using the first digital electrical signal and the second digital electrical signal may include performing a weighted sum operation on the first digital electrical signal and the second digital electrical signal and outputting a result of the weighted sum operation as the output frame.

According to an example embodiment of the present disclosure, the method may further comprise outputting a compressed file obtained by compressing a first digital electrical signal corresponding to a first frame to the memory, and outputting the at least part of the temporarily stored digital electrical signal to the external device may include decompressing the compressed file output from the memory and outputting the decompressed file to the external circuit.

According to an example embodiment of the present disclosure, there may be provided a storage medium storing commands that are executed by at least one processor to enable the at least one processor to perform at least one operation that comprises converting an analog electrical signal output from each of the plurality of pixels into a digital electrical signal, temporarily storing the digital electrical signal in the memory, and outputting at least part of the temporarily stored digital electrical signal to an external circuit.

As is apparent from the foregoing description, according to example embodiments of the present disclosure, there are provided an image capturing sensor having a memory and a method for controlling the same. Even when performing high-speed read-out or multi-sampling, the sensor may output data in compliance with the output speed defined for an interface. Image data may temporarily be stored in the memory before output to an external device. Thus, a constant output speed may be maintained regardless of image capturing modes.

The example embodiments disclosed herein are provided for description and understanding of the disclosed technology and do not limit the scope of the present disclosure. Accordingly, the scope of the present disclosure should be interpreted as including all changes or various embodiments based on the technical spirit of the present disclosure.

What is claimed is:

1. A sensor, comprising:
a pixel array including a plurality of pixels;
a read-out circuit configured to process an analog electrical signal at a first speed, wherein the processing of the analog electrical signal includes receiving the analog electrical signal output from each of the plurality of pixels, converting the analog electrical signal into a digital electrical signal, and outputting the digital electrical signal, wherein the first speed is faster than a speed defined for an interface for data communication between the sensor and an external circuit; and
a memory configured to temporarily store the digital electrical signal output from the read-out circuit and output at least part of the temporarily stored digital electrical signal to the external circuit at a second speed,
wherein the second speed is adjusted, for complying with the speed defined for the interface, to correspond to the speed defined for the interface, based on a memory control signal from a processor connected to the sensor.

2. The sensor of claim 1,
wherein the read-out circuit includes a plurality of analog-to-digital converters (ADCs), and
wherein the sensor further comprises a switching circuit configured to control connection between the pixel array and the plurality of ADCs.

3. The sensor of claim 2,
wherein the pixel array includes a plurality of photodiodes for converting received light into the analog electrical signal,
wherein when an image capturing mode is a low-illuminance image capturing mode, the switching circuit is configured to connect the plurality of ADCs to one of the plurality of photodiodes, and
wherein each of the plurality of ADCs is configured to perform, in parallel, conversion of a first analog electrical signal output from the one of the plurality of photodiodes into a first digital electrical signal.

4. The sensor of claim 2,
wherein the pixel array includes a plurality of photodiodes for converting received light into the analog electrical signal,
wherein, when an image capturing mode is a high-speed image capturing mode, the switching circuit is configured to connect each of the plurality of ADCs to a respective one of the plurality of photodiodes, and
wherein each of the plurality of ADCs performs, in parallel, conversion of a second analog electrical signal output from the respective one of the plurality of photodiodes into a second digital electrical signal.

5. The sensor of claim 1,
wherein, in a first read-out mode,
the read-out circuit is configured to process the analog electrical signal at the first speed,
and the memory is configured to output the at least part of the temporarily stored digital electrical signal to the external circuit at the second speed, and
wherein, in a second read-out mode,
the read-out circuit is configured to process the analog electrical signal at a third speed different from the first speed, and the memory is configured to output the at least part of the temporarily stored digital electrical signal to the external circuit at the second speed.

6. The sensor of claim 1, wherein the memory is configured to store a first digital electrical signal corresponding to a first frame output from the read-out circuit for a first period of time and store a second digital electrical signal corresponding to a second frame output from the read-out circuit for a second period of time.

7. The sensor of claim 6, further comprising a computation circuit configured to receive the first digital electrical signal corresponding to the first frame and the second digital electrical signal corresponding to the second frame and generate an output frame using the first digital electrical signal and the second digital electrical signal.

8. The sensor of claim 7, wherein the computation circuit is configured to perform a weighted sum operation on the first digital electrical signal and the second digital electrical signal and output a result of the weighted sum operation as the output frame.

9. The sensor of claim 1, wherein a compressed file obtained by compressing a first digital electrical signal corresponding to a first frame output from the read-out circuit is output to the external circuit.

10. The sensor of claim 9, wherein the sensor further comprises a decompression circuit configured to decompress the compressed file and output the decompressed file to the external circuit.

11. A method for controlling a sensor including a plurality of pixels and a memory, the method comprising:
processing an analog electrical signal at a first speed, wherein the processing of the analog electrical signal includes receiving an analog electric signal output from each of the plurality of pixels, converting an analog electrical signal into a digital electrical signal, and outputting the digital electric signal, wherein the first speed is faster than a speed defined for an interface for data communication between the sensor and an external circuit;
temporarily storing the digital electrical signal in the memory; and
outputting at least part of the temporarily stored digital electrical signal to thean external circuit at a second speed,
wherein the second speed is adjusted, for complying with the speed defined for the interface, to correspond to the speed defined for the interface, based on a memory control signal from a processor connected to the sensor.

12. The method of claim 11, wherein converting the analog electrical signal output from each of the plurality of pixels into the digital electrical signal comprises:
when an image capturing mode is a low-illuminance image capturing mode, performing in parallel, multiple times, conversion of a first analog electrical signal output from one of a plurality of photodiodes included in the plurality of pixels into a first digital electrical signal.

13. The method of claim 11, wherein converting the analog electrical signal output from each of the plurality of pixels into the digital electrical signal comprises:
when an image capturing mode is a high-speed image capturing mode, performing, in parallel, conversion of a second analog electrical signal output from each of a plurality of photodiodes included in the plurality of pixels into a second digital electrical signal.

14. The method of claim 11, wherein temporarily storing the digital electrical signal in the memory comprises:
storing a first digital electrical signal corresponding to a first frame and storing a second digital electrical signal corresponding to a second frame.

15. The method of claim 14, further comprising:
generating an output frame using the first digital electrical signal and the second digital electrical signal; and
outputting the generated output frame to the external circuit.

* * * * *